United States Patent
Otani et al.

(10) Patent No.: US 7,039,903 B2
(45) Date of Patent: May 2, 2006

(54) METHOD OF AND DEVICE FOR COLLATING DATA, AND COMPUTER PRODUCT

(75) Inventors: Takeshi Otani, Kawasaki (JP); Yasushi Yamazaki, Kawasaki (JP); Hitoshi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 600 days.

(21) Appl. No.: 09/983,370

(22) Filed: Oct. 24, 2001

(65) Prior Publication Data

US 2004/0015457 A1    Jan. 22, 2004

(30) Foreign Application Priority Data

Mar. 21, 2001    (JP)    ............................. 2001-081638

(51) Int. Cl.
*G06F 9/44*    (2006.01)

(52) U.S. Cl. ...................... 717/128; 717/103; 717/106

(58) Field of Classification Search ........ 717/100–103, 717/170, 128, 106; 707/1, 100, 203

See application file for complete search history.

(56) References Cited

U.S. PATENT DOCUMENTS

| | | | | |
|---|---|---|---|---|
| 5,752,039 A | * | 5/1998 | Tanimura | 717/168 |
| 6,536,037 B1 | * | 3/2003 | Guheen et al. | 717/151 |
| 6,606,744 B1 | * | 8/2003 | Mikurak | 717/174 |
| 6,615,166 B1 | * | 9/2003 | Guheen et al. | 717/140 |
| 6,643,668 B1 | * | 11/2003 | Sluiman | 707/200 |
| 6,694,336 B1 | * | 2/2004 | Multer et al. | 707/201 |
| 6,769,054 B1 | * | 7/2004 | Sahin et al. | 717/128 |

* cited by examiner

*Primary Examiner*—Wei Y. Zhen
*Assistant Examiner*—Mulubrhan Tecklu
(74) *Attorney, Agent, or Firm*—Staas & Halsey LLP

(57) ABSTRACT

The collating device includes the Formant estimation section that estimates feature amount data that represents a time-based change in frequencies of first and second Formants from voice data input through the microphone. The difference computing section calculates a difference between some reference feature amount data and the feature amount data as the feature-amount difference data. This feature-amount difference data is stored in a database. The feature-amount difference data corresponding to voice data input upon collation is collated with the feature-amount difference data registered in the database, and the result is output.

14 Claims, 15 Drawing Sheets

| INDEX | DIFFERENCE FEATURE AMOUNT DATA | | | | | |
|---|---|---|---|---|---|---|
| | F1(t1) | F2(t1) | F1(t2) | F2(t2) | F1(t3) | F2(t3) |
| 0 | 15 | 20 | 55 | -48 | 4 | -34 |
| 1 | -44 | 20 | -22 | 15 | 0 | 3 |
| 2 | 7 | -11 | 23 | 31 | 63 | 8 |
| ⋮ | | | | | | |
| num | 25 | 17 | -1 | -3 | 54 | 39 |
| | | | | | | |

FIG.7

DIFFERENCE FEATURE AMOUNT DATA 209

| INDEX | NAME | fs(0,0) | fs(0,1) | ...... | fs(0,255) | fs(1,0) | fs(1,1) | ...... | fs(1,255) | fs(2,0) | ...... | fs(255,255) |
|---|---|---|---|---|---|---|---|---|---|---|---|---|
| 0 | A | 1 | 1 | | -5 | -1 | 13 | | 7 | 5 | | -28 |
| 1 | B | 0 | 1 | | 2 | 3 | 0 | | -1 | 2 | | 13 |
| 2 | A | 0 | 0 | | -2 | -2 | -1 | | 2 | -3 | | 5 |
| | | | | | | | | | | | | |
| num | Z | 3 | 3 | | 2 | -1 | -3 | | 1 | 4 | | 1 |

FIG.12

| INDEX | ACCOUNT NO. | VOICE FEATURE-AMOUNT DIFFERENCE DATA / IMAGE FEATURE-AMOUNT DIFFERENCE DATA ||||||||
|---|---|---|---|---|---|---|---|---|
| | | F1(t1) | F2(t1) | F1(t2) | F2(t2) | ...... | F1(tn) | F2(tn) |
| | | d1(x) | d1(y) | d2(x) | d2(y) | ...... | dn(x) | dn(y) |
| 0 | 002086 | 15 | 20 | 55 | -48 | ...... | 4 | -34 |
| | | 0 | 2 | 3 | 5 | ...... | ///// | ///// |
| 1 | 974122 | -44 | 20 | -22 | -15 | ..... 255 233 | 0 | 3 |
| | | 0 | 133 | 1 | 4 | ..... 255 100 | ///// | ///// |
| | | | | | | | | |
| | 992855 | 25 | 17 | -1 | -3 | ...... | 54 | 39 |
| num | | 0 | 0 | 0 | 35 | ..... 255 34 | ///// | ///// |

319

METHOD OF AND DEVICE FOR COLLATING DATA, AND COMPUTER PRODUCT

FIELD OF THE INVENTION

The present invention relates to a technology for collating various data such as audio data and image data and requires less amount of memory for the process.

BACKGROUND OF THE INVENTION

In the field of personal identification and data retrieval, data collating devices, which use input data as a collate key, and collate the data with registered data within a database to output the result of collation, have been widely used. However, in the conventional data collating devices, as the registered data increase, the amount of memory required for the database increases, resulting in a problem of high costs and the necessity of having to provide a firm system construction. Thus, there have been urgent demands for means and methods for effectively solving the above-mentioned conventional problems.

FIG. 15 is a block diagram that shows a construction of a conventional data collating device. The input section 10 is used for inputting physical amount data such as audio data and image data. The feature amount extracting section 20 extracts feature amount data from physical amount data input through the input section 10. This feature amount data is/are data for characterizing the physical amount data.

More specifically, when physical data is audio data, voice pitches, power, spectrum, etc., are used as the feature amount data. On the other hand, when the physical data is image data, density histograms, edges, etc., are used as the feature amount data. The switch 30 switches the output destinations of the feature amount data from the feature amount extracting section 20.

When the feature amount data is registered in a database 50, the switch 30 switches the output destinations of the feature amount data from the feature amount extracting section 20 to the writing section 40. When the feature amount data is collated with any feature amount data within the database 50, the switch 30 switches the output destinations of the feature amount data from the feature amount extracting section 20 to a collating section 60.

Upon registering the feature amount data, the writing section 40 writes the feature amount data that is successively output from the feature amount extracting section 20 in the database 50. Therefore, a plurality of pieces of the feature amount data is stored in the database 50. Upon collation, the collating section 60 collates the feature amount data (collation key) output from the feature amount extracting section 20 with a plurality of pieces of the feature amount data stored in the database 50, and outputs the result of collation (coincidence or non-coincidence).

Operations of the data collating device will be explained below. However, for the sake of simplicity, operations upon registration and collation will be explained separately. Upon registration, the switch 30 is switched by a control unit (not shown) towards the side of the writing section 40. In this state, when physical amount data to be registered is input from the input section 10, the feature amount extracting section 20 extracts feature amount data from the physical amount data. This feature amount data is input to the writing section 40 through the switch 30. Thus, the writing section 40 writes the feature amount data in the database 50. Thereafter, the above-mentioned operations are repeated so that a plurality of pieces of the feature amount data is successively stored in the database 50.

Upon collation, the switch 30 is switched by the control unit (not shown) towards the side of the collating section 60. In this state, when physical amount data is input from the input section 10 as a collation key, the feature amount extracting section 20 extracts feature amount data from the physical amount data as collation key. This feature amount data is input to the collating section 60 through the switch 30. Thus, the collating section 60 successively collates this feature amount data with a plurality of pieces of the feature amount data stored in the database 50 using the input feature amount data as a key, and then outputs the result of collation (coincidence or non-coincidence).

Thus, all the pieces of the feature amount data extracted by the feature amount extracting section 20 upon registration are stored in the database 50, and upon collation, these pieces of the feature amount data serving as collation keys are collated with feature amount data within the database 50.

However, since all the pieces of the feature amount data are stored in the database 50, there arises a drawback that more amount of memory needs to be prepared as the feature amount data to be registered increases. This problem becomes more serious when a large amount of data is handled, because, great amount of memory is required whereby the cost increases.

SUMMARY OF THE INVENTION

It is an object of this invention to provide a technology which can reduce the amount of memory required upon registration and/or collation of data.

According to the present invention, a feature amount data is extracted from a physical amount data, a difference between the feature amount data and a predetermined reference feature amount data is calculated and taken as the feature-amount difference data, the feature-amount difference data is stored in a database, and the feature-amount difference data corresponding to physical amount data input upon collation is collated with the feature amount difference data registered in the database, and the result of collation is output. Thus, only feature-amount difference data is stored in a database.

Other objects and features of this invention will become apparent from the following description with reference to the accompanying drawings.

BRIEF DESCRIPTION OF THE DRAWINGS

FIG. 2 is a drawing that shows a structure of a database 111 shown in FIG. 1;

FIG. 7 is a drawing that shows a structure of a database 209 shown in FIG. 6;

FIG. 12 is a drawing that shows a structure of a database 319 shown in FIG. 10;

DESCRIPTION OF THE PREFERRED EMBODIMENTS

Embodiments of the data collate program, data collating method, and the data collating device in accordance with the present invention will be explained below with reference to the accompanying drawings.

Figure 1:
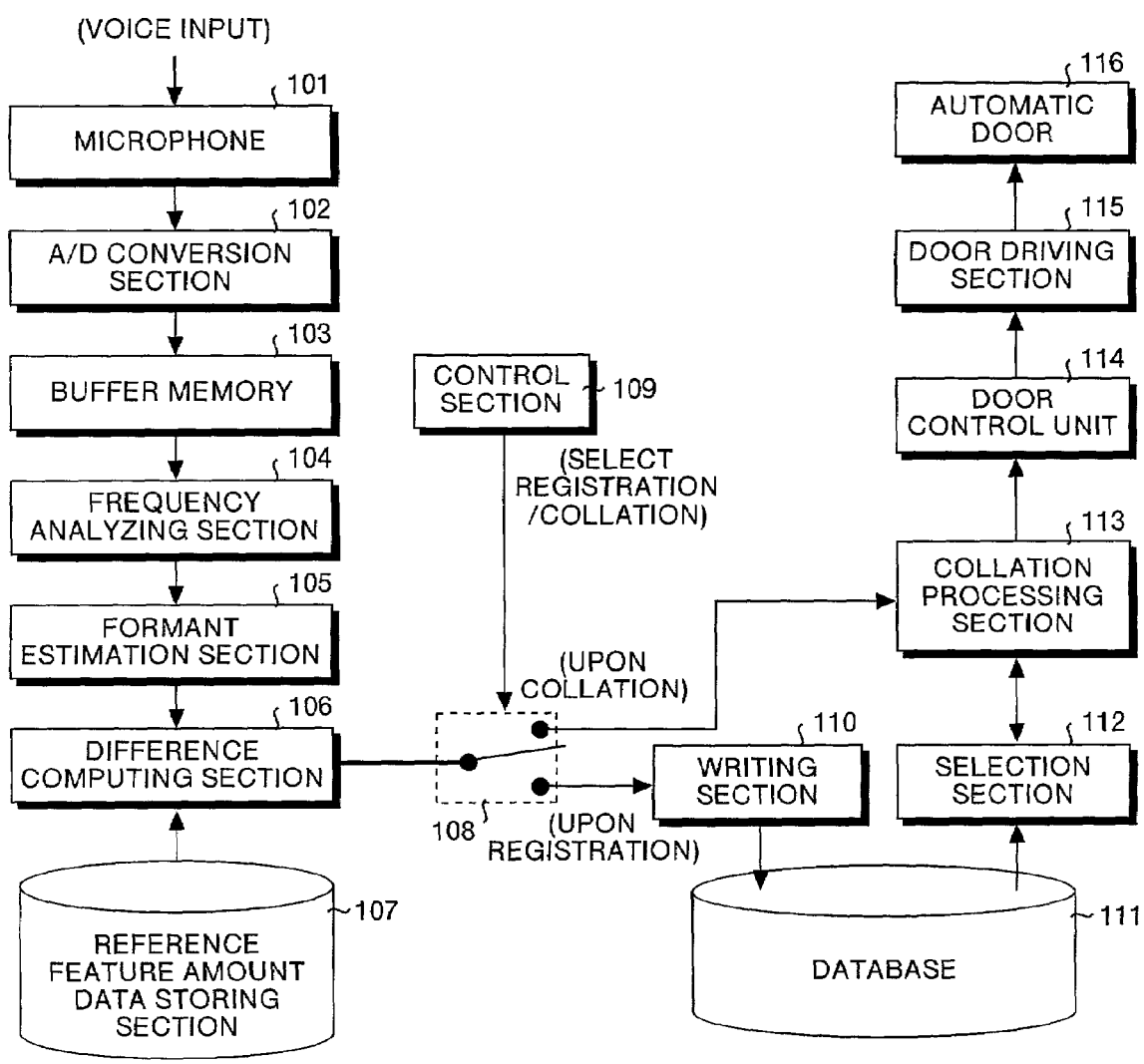
FIG. 1 is a block diagram that shows a construction of a first embodiment of the present invention.

FIG. 1 is a block diagram that shows a construction of a first embodiment in accordance with the present invention. FIG. 1 shows a data collating device used for an automatic door switching control process that is installed at a gateway to a security zone. The microphone 101 is placed at the entrance of the security zone so as to convert voice of an entering person into voice data. The A/D (Analog/Digital) conversion section 102 converts analog voice data into digital voice data.

The buffer memory 103, which is for example a RAM (Random Access Memory), temporarily stores digital voice data that has been converted by the A/D conversion section 102. The frequency analyzing section 104 analyzes the voice data stored in the buffer memory 103 based on intensity distribution on each frequency basis, as shown in FIG. 4C. In other words, the frequency analyzing section 104 analyzes the spectrum of the voice data.

The Formant estimation section 105 estimates a time-based amount of change of Formant frequencies that represents a feature amount of personal voice. The Formant, which is represented by peaks of spectrum shown in FIG. 4C, includes the first Formant, second Formant, third Formant, . . . , in the ascending order of frequencies.

The Formant is considered to be an important factor in sensing vowels and consonants, and the time-based amount of change in their frequencies has a difference depending on individuals. Therefore, in the first embodiment, the time-based amount of change in Formant frequencies is utilized as feature amount data representing a personal feature amount, that is, a feature of voice data. Pieces of the feature amount data, which represent time-based amounts of change in the respective frequencies of the first Formant and the second Formant, are output from the Formant estimation section 105.

Figure 4A:
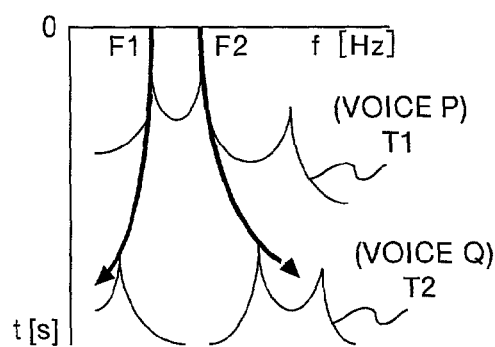
FIG. 4A to FIG. 4C are drawings that explain the operation of the first embodiment.

With respect to voice P and Q, FIG. 4A shows spectra T1 and T2 and time-based amounts of change in the respective frequencies of the first Formant F1 and the second Formant F2. The frequency f has been plotted on the axis of abscissas and the time t has been plotted on the axis of ordinates.

Figure 4B:
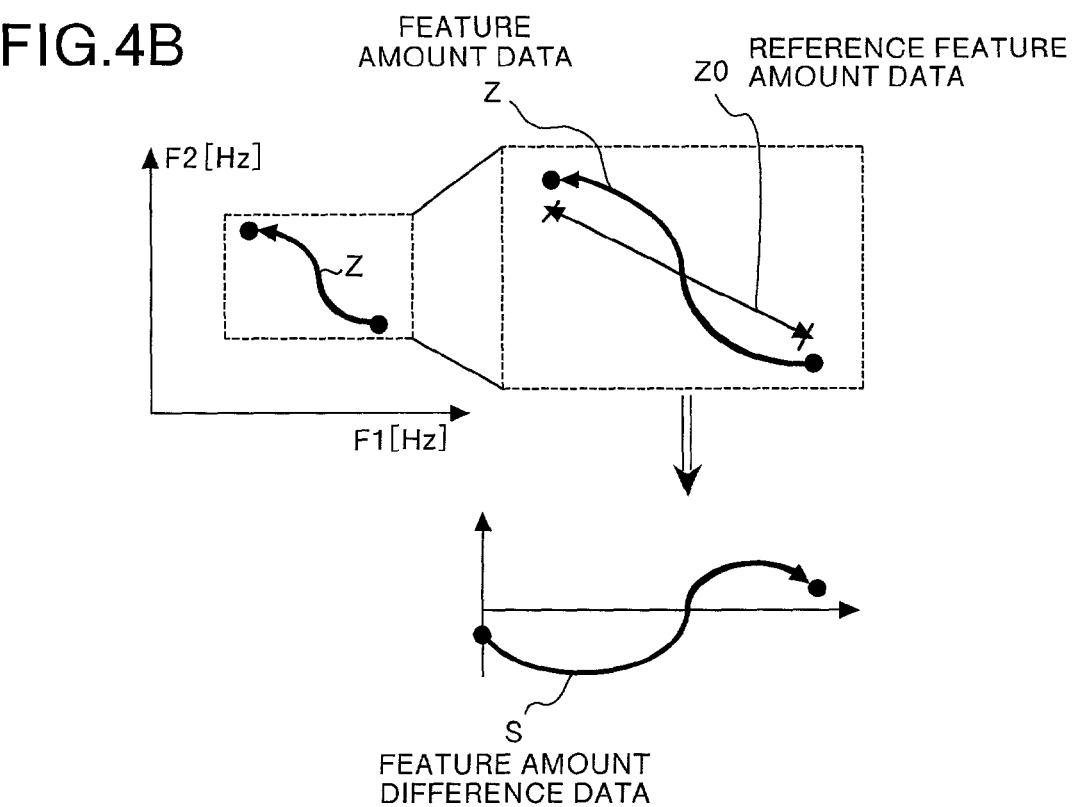
Figure 4C:
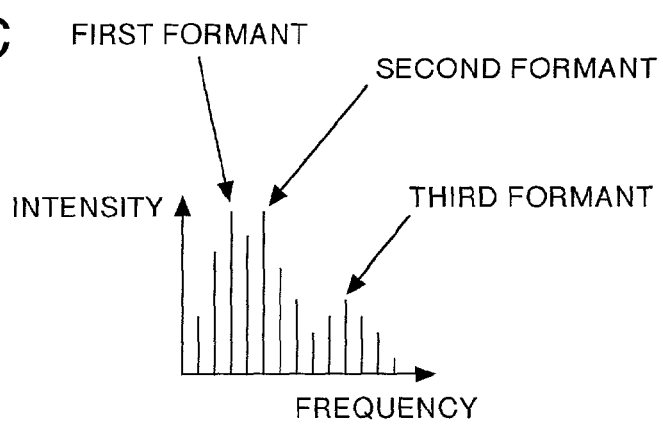

As clearly shown by this Figure, when Q is pronounced following P, the frequencies of the first Formant F1 and the second Formant F2 vary with time. The Formant estimation section 105 outputs the time-based amounts of change in the frequencies of the first Formant F1 and the second Formant F2 as feature amount data. FIG. 4B shows feature amount data Z in which the frequency of the first Formant F1 is plotted on the axis of abscissas and the frequency of the second Formant F2 is plotted on the axis of ordinates.

Returning to FIG. 1, the difference computing section 106 computes a difference between the feature amount data from the Formant estimation section 105 and the reference feature amount data preliminarily stored in a reference feature amount data storing section 107, and this is output as feature-amount difference data. The reference feature amount data is data obtained by sampling a plurality of pieces of the feature amount data and averaging these pieces of data.

FIG. 4B shows the relationship between the reference feature amount data Z0 and the feature amount data Z. As can be clearly seen, since the feature amount data Z is data dependent on individuals, there is a difference between the reference feature amount data Z0 and the feature amount data Z. Therefore, the difference computing section 106 computes the above-mentioned difference, and outputs this as feature-amount difference data S shown in FIG. 4B.

Returning to FIG. 1, the switch 108 switches output destinations of feature amount difference data from the difference computing section 106. In other words, when the feature-amount difference data is registered in the database 111, the switch 108 switches the output destination of the feature-amount difference data from the difference computing section 106 to the writing section 110. When the feature amount difference data is collated with the feature-amount difference data within the database 111, the switch 108 switches the output destination of the feature amount difference data from the difference computing section 106 to a collation processing section 113. The control unit 109 controls switching of the switch 108.

Upon registration of the feature amount difference data, the writing section 110 writes the feature-amount difference data successively output from the difference computing section 106 in the database 111. Therefore, a plurality of pieces of feature-amount difference data is stored in the database 111. FIG. 2 is a drawing that shows the structure of the database 111. As shown in this Figure, in the database 111, indexes 0 to num are allocated to the plurality pieces of feature-amount difference data. The feature amount difference data is constituted by difference data of frequencies of the first and second Formants F1 and F2 at respective times t1, t2 and t3.

Returning to FIG. 1, the selection section 112 selects feature amount difference data in succession starting with index 0 from the database 111 (see FIG. 2). Upon collation, the collation processing section 113 collates the feature-amount difference data (collation key) output from the difference computing section 106 with feature-amount difference data that has been stored in the database 111 and also selected by the selection section 112 in succession, and outputs the result of collation (coincidence or non-coincidence).

When the difference between the two pieces of feature-amount difference data is less than a threshold value, the collation processing section 113 determines that the result of collation shows "coincidence", and outputs a signal "1". In contrast, when the difference between the two pieces of feature amount difference data is not less than the threshold value, the collation processing section 113 determines that the result of collation shows "non-coincidence", and outputs a signal "0".

Based upon the result of collation given by the collation processing section 113, a door control unit 114 controls a door driving section 115 for driving an automatic door 116. More specifically, upon receipt of signal "1" (meaning coincidence of data) from the collation processing section 113, the door control unit 114 outputs a control signal for opening the door to the door driving section 115. In contrast, upon receipt of signal "0" (meaning non-coincidence of data) from the collation processing section 113, the door control unit 114 is not allowed to output the control signal. Therefore, in this case, the automatic door 116 is not opened.

The door driving section 115 is a driving source such as a motor for driving the automatic door 116 to be opened and closed, and controlled by the door control unit 114. The automatic door 116 is placed at the gateway of a security zone, and driven to be opened and closed by the door driving section 115.

Operations (upon registration and collation) of the first embodiment will be explained while referring to the flow-chart shown in FIG. 3. To begin with, an explanation will be given of an operation by which registering-use feature-amount difference data is registered in the database 111 shown in FIG. 1. At the time of the registration, a plurality of authorized users, who are allowed to enter the security zone through the automatic door 116, utter a vocal sound in succession toward the microphone 101 shown in FIG. 1. The vocal sound is equivalent to a pass word, and given as, for example, P and Q.

Moreover, upon registration, the switch 108 has been switched by the control of the control unit 109 to the writing section 110. In this state, at step SA1 shown in FIG. 3, the vocal sound of each authorized users for the room is input through the microphone 101. At step SA2, the A/D conversion section 102 converts the voice data (analog) from the microphone 101 to digital voice data. This digital voice data is temporarily stored in the buffer memory 103. Thereafter, vocal sounds of the second authorized user and thereafter are input so that a plurality of pieces of voice data are successively stored in the buffer memory 103.

At step SA3, the frequency analyzing section 104 successively reads the voice data from the buffer memory 103, and carries out a frequency analysis (spectrum analysis: see FIG. 4C) on the voice data. At step SA4, based upon the results of analysis in the frequency analyzing section 104, the Formant estimation section 105 finds time-based changes (see FIG. 4A) of the respective frequencies of the first Formant F1 and the second Formant F2, and outputs these as feature amount data.

More specifically, supposing that the feature amount data is X(t), the feature amount data X(t) is represented by the following determinant (1):

$$X(t) = \begin{bmatrix} 715, 1120 \\ 555, 1752 \\ 304, 2366 \end{bmatrix} \quad (1)$$

This determinant (1) represents time-based changes in the respective frequencies of the first Formant F1 and the second Formant F2 at times t1, t2 and t3. In other words, the first column of the determinant (1) describes the frequency 715 Hz (time t1), 555 Hz (time t2) and 304 Hz (time t3) in the first Formant F1. The first column shows the time-based changes in frequencies of the first Formant.

Moreover, the second column of the determinant (1) describes the frequency 1120 Hz (time t1), 1752 Hz (time t2) and 2366 Hz (time t3) in the second Formant F2. The second column shows the time-based changes in frequencies of the second Formant.

At step SA5, the difference computing section 106 computes a difference between the reference feature amount data stored in the reference feature amount data storing section 107 and the feature amount data X(t) from the Formant estimation section 105. In this case, it is supposed that reference feature amount data $X_0(t)$ represented by the following determinant (2) is stored in the reference feature amount data storing section 107.

$$X_0(t) = \begin{bmatrix} 700, 1100 \\ 500, 1800 \\ 300, 2400 \end{bmatrix} \quad (2)$$

This determinant (2) represents the average of time-based changes in the respective frequencies of the first Formant F1 and the second Formant F2 at times t1, t2 and t3. In other words, the first column of the determinant (2) describes the average frequency 700 Hz (time t1), 500 Hz (time t2) and 300 Hz (time t3) in the first Formant F1. The first column shows the averages of time-based changes in frequencies of the first Formant.

Moreover, the second column of the determinant (2) describes the average frequency 1100 Hz (time t1), 1800 Hz (time t2) and 2400 Hz (time t3) in the second F2. The second column shows the averages of the time-based changes in frequencies of the second Formant.

In the difference computing process, the difference computing section 106 executes a subtraction on each element of the feature amount data X(t) and the average feature amount data $X_0(t)$ so that feature amount difference data $X_s(t)$ represented by the following determinant (3) is found.

$$Xs(t) = \begin{bmatrix} +15, +20 \\ +55, -48 \\ +4, -34 \end{bmatrix} \quad (3)$$

In other words, the first column of the determinant (3) describes the difference frequency +15 Hz (time t1), +55 Hz (time t2) and +4 Hz (time t3) with respect to the first Formant F1. Moreover, the second column of the determinant (3) describes the difference frequency +20 Hz (time t1), −48 Hz (time t2) and −34 Hz (time t3) with respect to the second Formant F2.

At step SA6, a determination is made as to whether the current process is registration or collation, and in this case, the determination is made as registration. Consequently, the feature amount difference data $X_s(t)$ from the difference computing section 106 is input to the writing section 110 through the switch 108. At step SA7, the writing section 110 stores the feature amount difference data $X_s(t)$ as a record at the last index num (in this case, 0) in the database 111 shown in FIG. 2.

In the record at the last index num (=0), the first Formants F1 (t1), F1 (t2) and F1 (t3) respectively correspond to the difference frequency +15 Hz (time t1), +55 Hz (time t2) and +4 Hz (time t3) described in the first column in the above-mentioned determinant (3).

Moreover, in the record at the last index num (=0) the second Formants F2 (t1), F2 (t2) and F2 (t3) respectively correspond to the difference frequency +20 Hz (time t1), −48 Hz (time t2) and −34 Hz (time t3) described in the second column in the above-mentioned determinant (3). Thereafter, with respect to all voice data stored in the buffer memory 103, pieces of feature-amount difference data are successively stored in the database 111. When the feature amount difference data has been stored in the last index num, the sequence of registration processes is completed.

Next, an explanation will be given of a collating operation in which the plurality of pieces of feature-amount difference data stored in the database 111 are used. In this collating operation, the switch 108 is switched by the control of the control unit 109 to the collation processing section 113. In this state, a user who wishes to enter the security zone through the automatic door 116 utters a vocal sound (pass word) toward the microphone 101.

Figure 3:
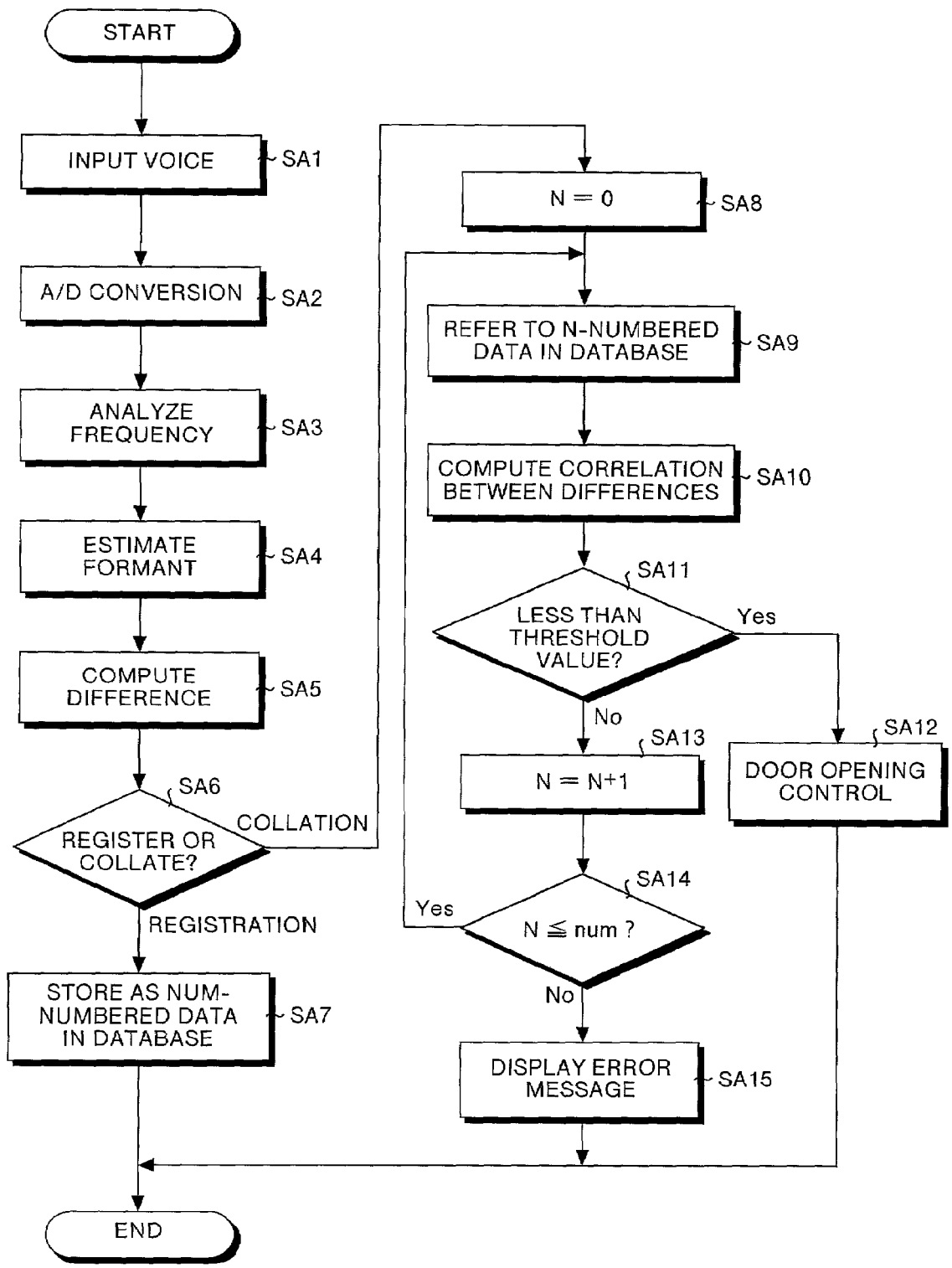
FIG. 3 is a flowchart that explains the operation of the first embodiment.

Then, at step SA1 shown in FIG. 3, the vocal sound of the user is input through the microphone 101. At step SA2, the A/D conversion section 102 converts voice data (analog) from the microphone 101 to digital voice data. This voice data is temporarily stores in the buffer memory 103.

At step SA3, in the same manner as the aforementioned operation, the frequency analyzing section 104 successively reads the voice data from the buffer memory 103, and carries out a frequency analysis (spectrum analysis: see FIG. 4C) on the voice data. At step SA4, based upon the results of analysis in the frequency analyzing section 104, the Formant estimation section 105 finds time-based changes (see FIG. 4A) of the respective frequencies of the first Formant F1 and the second Formant F2, and outputs these as feature amount data. In this case, it is assumed that the feature amount data is the feature amount data X(t) represented by the determinant (1).

At step SA5, the difference computing section 106 computes a difference between the reference feature amount data $X_0(t)$ (see determinant (2)) stored in the reference feature amount data storing section 107 and the feature amount data X(t) from the Formant estimation section 105. The difference computing section 106 executes a subtraction on each element between the feature amount data X(t) and the reference feature amount data $X_0(t)$ to find feature amount difference data $X_s(t)$ (see determinant (3)).

At step SA6, a determination is made as to whether the current process is registration or collation, and in this case, the determination is made as collation. Consequently, the feature amount difference data $X_s(t)$ from the difference computing section 106 is input to the collation processing section 113 through the switch 108. At step SA8, the collation processing section 113 sets its inner variable N to 0. At step SA9, the collation processing section 113 allows the selection section 112 to select feature-amount difference data corresponding to index (in this case, 0) that has the same value as the inner variable N.

At step SA10, the collation processing section 113 executes a subtraction on each element between the feature-amount difference data $X_s(t)$ input from the difference calculation section 106 and the feature-amount difference data within the database that has been selected by the selection section 112 so as to find the correlation between the two pieces of data. At step SA11, the collation processing section 113 makes a determination as to whether or not the difference between the two pieces of data is less than a threshold value, and in this case, the determination is made as "Yes". In this case, the collation processing section 113 makes a determination as "coincidence", and admits the user as an authorized user for the room.

At step SA12, the collation processing section 113 outputs signal "1" (coincidence of data) to the door control unit 114. Consequently, the door driving section 115 is controlled by the door control unit 114 so as to open the automatic door 116. Thus, the user is allowed to enter the security zone through the automatic door 116.

In contrast, when the result of determination at step SA11 is "No", at step SA13, the collation processing section 113 increments the inner variable N by 1. At step SA14, the collation processing section 113 makes a determination as to whether or not the inner variable N is not more than the last index num in the database 111, and in the case of "Yes" in the result of determination, the processes of step SA9 and thereafter are executed repeatedly.

Moreover, in the case of "No" in the result of determination at step SA14, that is, in the case of "non-coincidence" in the result of determination, at step SA15, the collation processing section 113 gives an error message on a display, not shown, and outputs signal "0" (non-coincidence of data) to the door control unit 114. In this case, the door control unit 114 does not control the door driving section 115, with the result that the automatic door 116 is not opened. Therefore, the user is not allowed to enter the security zone.

As described above, in accordance with the first embodiment, the feature-amount difference data related to voice data is stored in the database 111. Therefore, in comparison with the conventional case in which the feature amount data, as it is, is stored in the database, it is possible to reduce the amount of memory required for data registration/collation.

Figure 5:
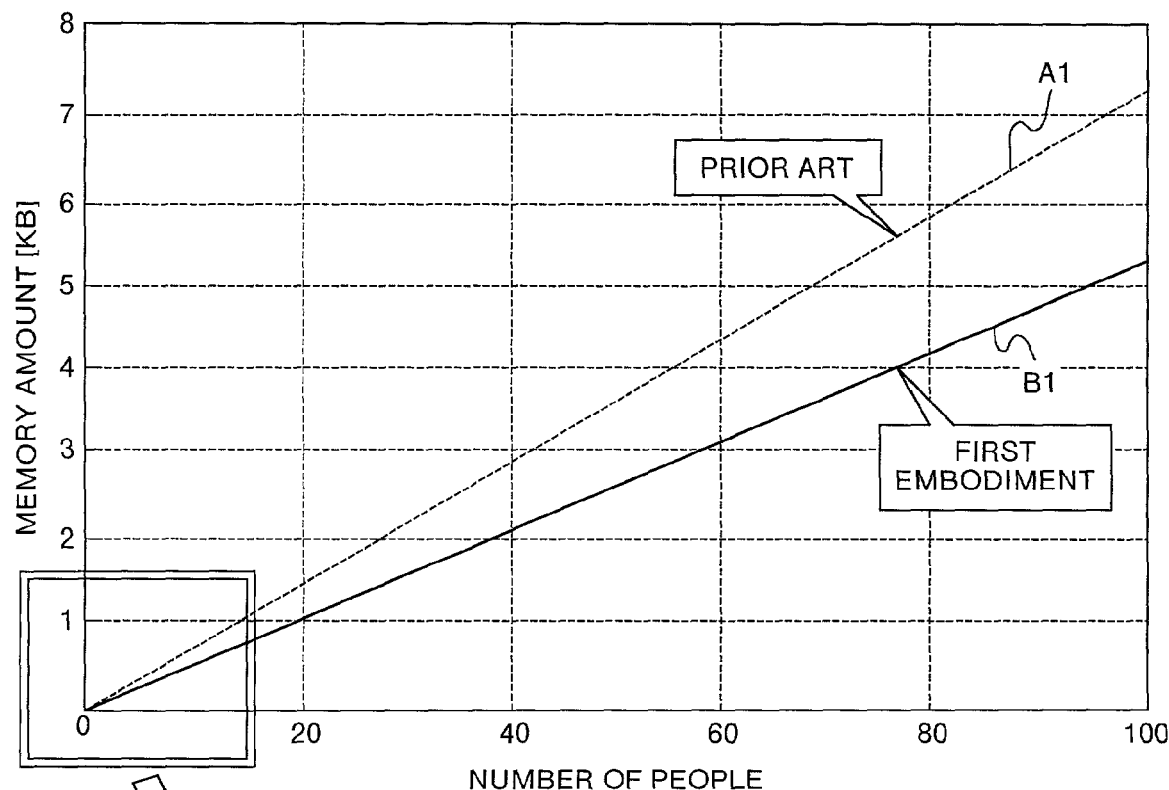
FIG. 5 is a drawing that explains the effects of the first embodiment.
Figure 5:
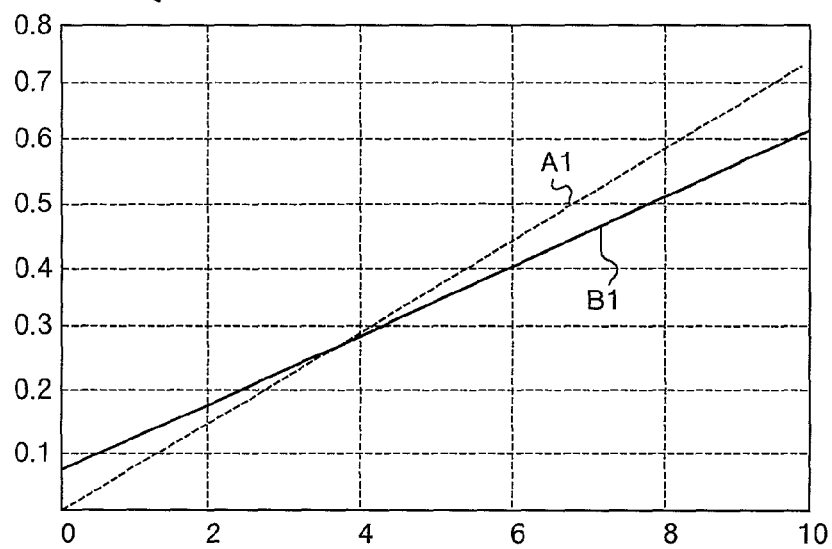

FIG. 5 is a drawing that explains the effects of the first embodiment for the above-mentioned reduction of the amount of memory. The axis of abscissas represents the number of authorized users for the room registered in the database 111, and the axis of ordinates represents the amount of memory. As clearly shown by characteristic line A1 indicating the conventional system and characteristic line B1 indicating the first embodiment, in the first embodiment, as the number of registered users increases, the difference in the amount of memory between the conventional system and the first embodiment becomes greater, indicating that the effect for the reduction in the amount of memory is high.

In the case of the number of users=100, in contrast to the amount of memory=7.2 KB in the conventional system, the first embodiment achieves the amount of memory=5.3 KB, which is reduced by approximately 26%. Moreover, as shown by an enlarged view indicated by an arrow, the effect of the first embodiment becomes greater as the number of users increases with the number of registered users of 4 being a turning point.

The graph shown in FIG. 5 were plotted based upon the following computing method. The feature amount data X(t) (see determinant (1)) is considered to represent feature-amount data in the conventional system. Supposing that the upper limit value of each element in the feature amount data X(t) is 4096 Hz, the amount of memory corresponding to 12 bits per element is required. Therefore, since the conventional feature amount data X(t) is constituted by 6 elements, the amount of memory 12×6 (bits) is required. Moreover, supposing that the number of registered users is x, the amount of memory is 12×6x (bits).

In contrast, in the feature-amount difference data $X_s(t)$ (see determinant (3)), supposing that the range of each element is ±256 Hz, 1 bit is required for plus/minus representation and 8 bits are required by 256 Hz, making it possible to represent 1 element by total 9 bits. Therefore, since the feature-amount difference data $X_s(t)$ is constituted by 6 elements, a sufficient memory amount is provided by 9×6 (bits).

Moreover, in the first embodiment, with respect to the reference feature amount data $X_0(t)$ (see determinant (2)), an amount of memory of 12×6 (bits) is required. Here, supposing that the number of registered users is x, a sufficient amount of memory is provided by 9×6x (bits)+12×6 (bits), indicating that the amount of memory is reduced in comparison with the conventional case.

The first embodiment assumes a case in which feature-amount difference data related to voice data is used. However, feature-amount difference data of image data may be used in place of the feature-amount difference data of the voice data. The following description will discuss this case as a second embodiment.

Figure 6:
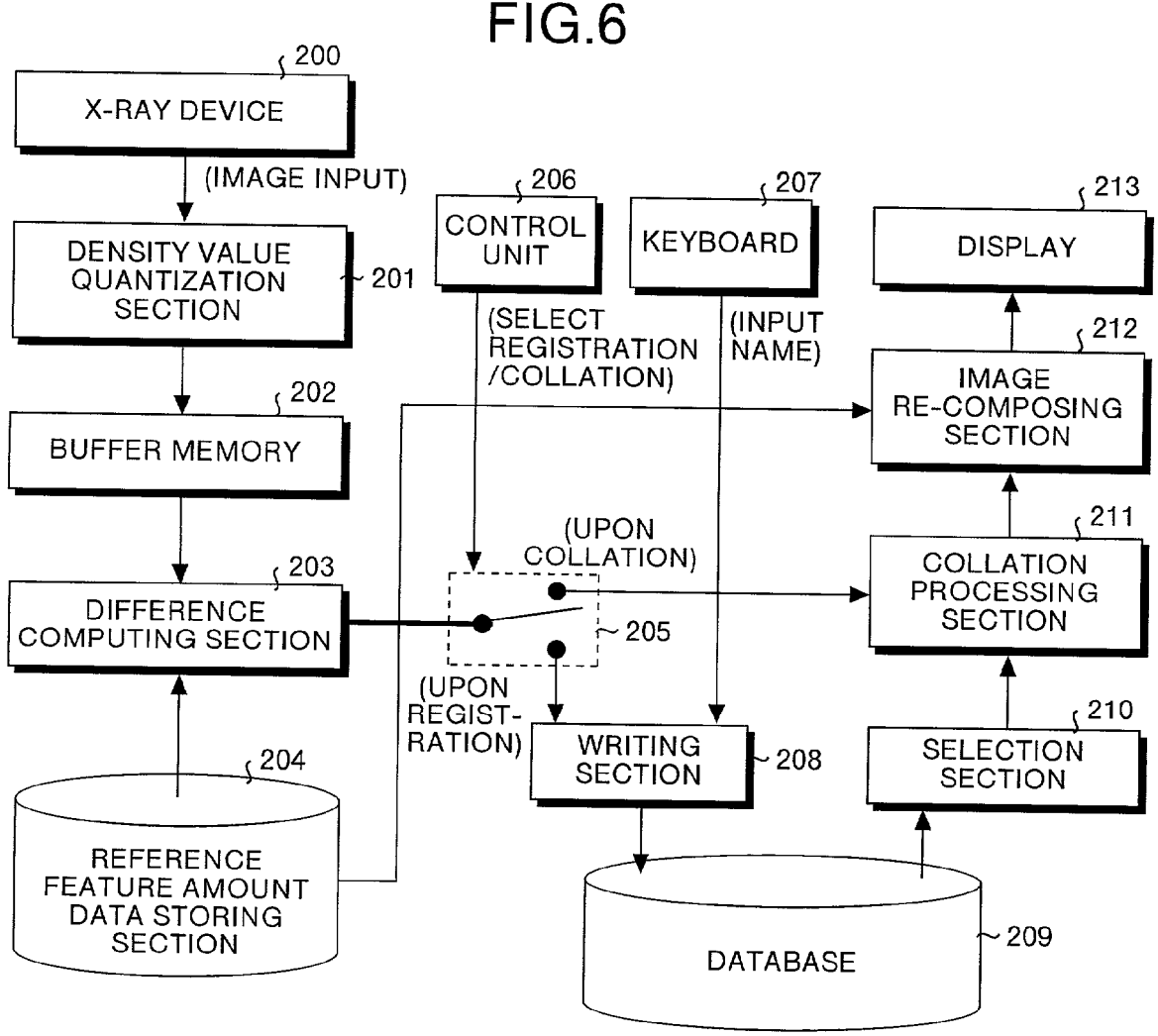
FIG. 6 is a block diagram that shows a construction of a second embodiment of the present invention.

FIG. 6 is a block diagram that shows a construction of the second embodiment in accordance with the present invention. In this data collating device X-ray photos, given as image data, are stored in a large-scale database, and when an X-ray photo has been picked up, a retrieval is made for previous X-ray photos of the corresponding patient. The X-ray device 200 takes an X-ray photo (variable density picture) of a patient, etc., by using X-rays, and outputs the resulting picture as image data.

The density-value quantization section 201 quantizes the image data input from the X-ray device 200 into representation of 256 pixels×256 pixels and density value=8 bits, and outputs this as feature amount data. The buffer memory 202, which is for example a RAM, temporarily stores the feature amount data from the density-value quantization section 201.

The difference computing section 203 computes a difference between the feature amount data from the buffer memory 202 and the reference feature amount data preliminarily stored in a reference feature amount data storing section 204, and outputs this as feature-amount difference data. The reference feature amount data is data obtained by sampling a plurality of pieces of the feature amount data and averaging these pieces of data.

The switch 205 switches output destinations of feature amount difference data from the difference computing section 203. In other words, when the feature-amount difference data is registered in the database 209, the switch 205 switches the output destination of the feature-amount difference data from the difference computing section 203 to the writing section 208. When the feature amount difference data is collated with the feature-amount difference data within the database 209, the switch 205 switches the output destination of the feature amount difference data from the difference computing section 203 to a collation processing section 211. The control unit 206 carries out a switching control process on the switch 205.

The key board 207 is used for inputting names of patients corresponding to image data (X-ray photos). Upon registration of feature-amount difference data, the writing section 208 writes the feature-amount difference data successively output from the difference computing section 203 in the database 209 in a manner so as to be associated by the names input by the keyboard 207. Therefore, the plurality of pieces of feature-amount difference data and the name data associated with these are stored in the database 209.

FIG. 7 is a drawing that shows the structure of the database 209. As indicated by this Figure, the database 209 is provided with fields, such as "index", "name" and "feature-amount difference data". The field "index" is set to 0 to num to which the pieces of feature-amount difference data (in this Figure, 256 $f_s$ (0,0) to $f_s$ (255, 255)) are respectively added. The field "name" is data related to names of patients whose X-ray photos corresponding to the feature-amount difference data have been taken. The field "feature-amount difference data" is a data collection consisting of differences of the density values of the respective 256 pixels.

Returning to FIG. 6, the selection section 210 successively selects the feature-amount difference data from the database 209 (see FIG. 7) starting with index 0. Upon collation, the collation processing section 211 computes the degree of similarity between the feature-amount difference data (collation key) output from the difference computing section 203 and the feature-amount difference data that has been stored in the database 209 and selected by the selection section 210, and outputs the data having the highest degree of similarity as the result of collation.

The image re-composing section 212 adds the result of collation (feature-amount difference data) from the collation processing section 211 and the reference feature amount data from the reference feature amount data storage section 204 so that an original feature amount data is generated, and then generates an original image data by carrying out a process such as a reverse operation on the feature amount data; thus, it carries out an image re-composing process. The display 213, which is a CRT (Cathode-Ray Tube), LCD (Liquid Crystal Display), etc., displays an X-ray photo of the patient in question based upon the image data from the image re-composing section 212.

Figure 8:
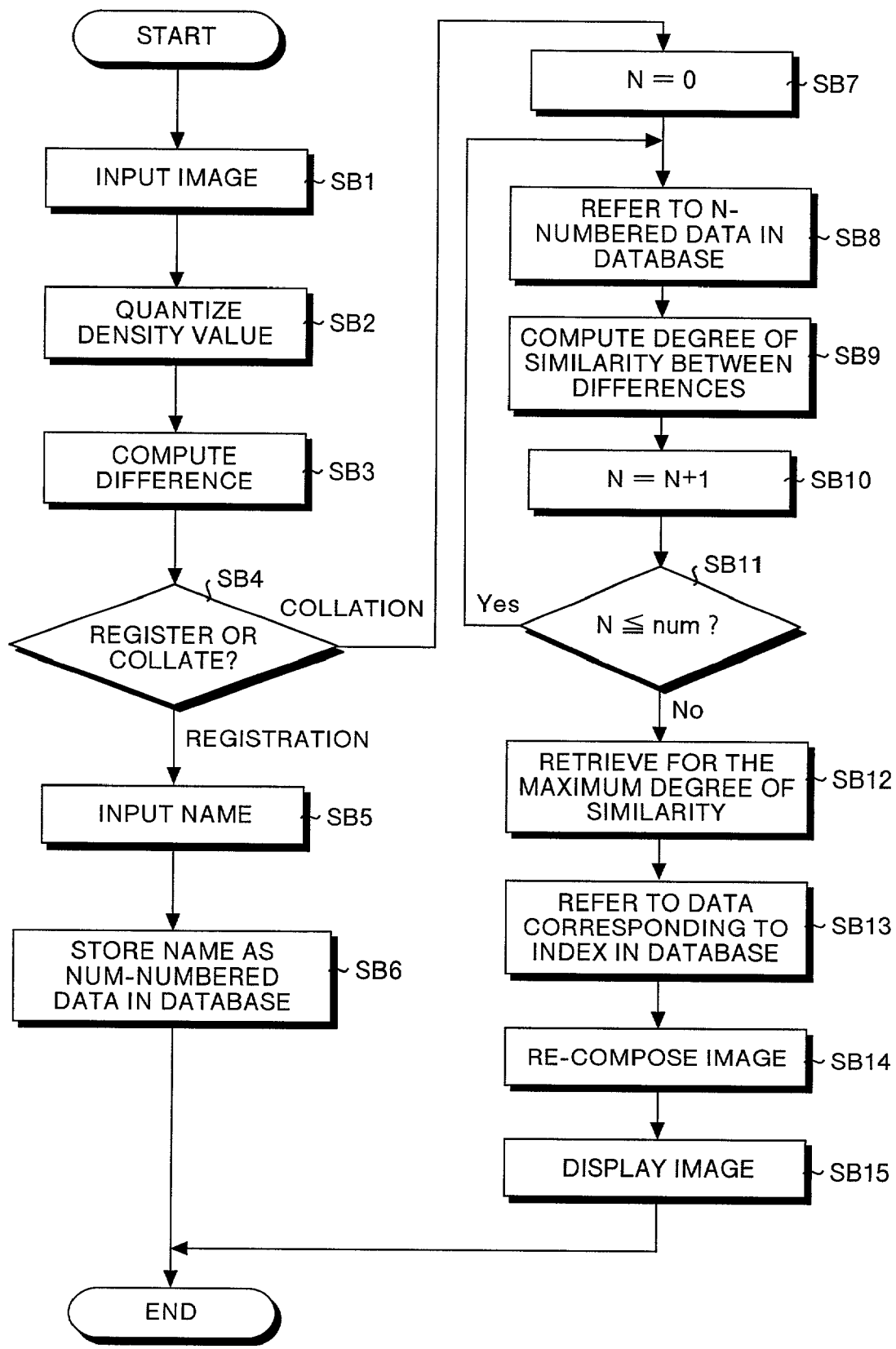
FIG. 8 is a flowchart that explains the operation of the second embodiment.

Operations (upon registration and collation) of the second embodiment will be explained referring to the flowchart shown in FIG. 8. To begin with, an explanation will be given of an operation by which registering-use feature-amount difference data is registered in the database 209 shown in FIG. 6. At the time of the registration, each time an X-ray photo of a patient has been picked up, the feature-amount difference data corresponding to this X-ray photo is stored in the database 209.

Moreover, upon registration, the switch 205 has been switched by the control of the control unit 206 to the writing section 208. In this state, when an X-ray photo of a patient is picked up, at step SB1 shown in FIG. 8, image data corresponding to the X-ray photo is input from the X-ray device 200 to the density-value quantization section 201. Thus, at step SB2, the density-value quantization section 201 quantizes the image data by using representation of 256 pixels×256 pixels with density value=8 bits, and outputs this as feature amount data. The feature amount data is temporarily stored in the buffer memory 202.

Supposing that the feature amount data is f(x, y), the feature amount data f(x, y) is represented by the following determinant (4):

$$f(x, y) = \begin{bmatrix} 10 & 11 & 2 \\ 7 & 193 & \\ 2 & & 70 \end{bmatrix} \quad (4)$$

In the above-mentioned determinant (4), the density value (8 bits) of each of 256 pixels×256 pixels represented by 256 rows×256 columns is described.

At step SB3, the difference computing section 203 computes a difference between the reference feature amount data stored in the reference feature amount data storing section 204 and the feature amount data f(x, y) (see determinant (4)) stored in the buffer memory 202. In this case, it is supposed that the reference feature amount data $f_0$ (x, y), represented by the following determinant (5), is stored in the reference feature amount data storing section 204.

$$f_0(x, y) = \begin{bmatrix} 9 & 10 & & 7 \\ 8 & 180 & & \\ & & & \\ 0 & & & 98 \end{bmatrix} \quad (5)$$

In the above-mentioned determinant (5), the average density value (8 bits) of each of 256 pixels×256 pixels represented by 256 rows×256 columns is described. In the computing process for the average density value, for example, pieces of image data of every 100 X-ray photos are used.

In the difference computing process, by carrying out a subtraction on each element between the feature amount data f(x, y) and the reference feature amount data $f_0$(x, y), the difference computing section 203 finds feature-amount difference data $f_s$ (x, y) represented by the following determinant (6).

$$f_s(x, y) = \begin{bmatrix} 1 & 1 & & -5 \\ -1 & 13 & & \\ & & & \\ 2 & & & -28 \end{bmatrix} \quad (6)$$

At step SB4, a determination is made as to whether the current process is registration or collation, and in this case, the determination is made as registration. At step SB5, the operator inputs the names of corresponding patients through the keyboard 207. Thus, the feature-amount difference data $f_s$(x, y) is input from the difference computing section 203 to the writing section 208, and the name data is also input thereto through the keyboard 207.

At step SB6, the writing section 208 stores the name (=A) and the feature-amount difference data $f_s$(x, y) as a record at the last index num (in this case, 0) of the database 209 shown in FIG. 7.

In the record at the last index num (=0), the feature-amount difference data $f_s$ (0,0) corresponds to the difference density value (=1) at one row and one column in the above-mentioned determinant (6). Successively, in the same manner, the feature-amount difference data $f_s$ (255, 255) corresponds to the difference density value (=−28) at 256 row and 256 column in the above-mentioned determinant (6). Thereafter, by executing the processes of steps SB1 to SB6 repeatedly, the feature-amount difference data and the names corresponding to a plurality of X-ray photos are successively stored in the database 209.

Next, an explanation will be given of the operation at the time of collation in which the plurality of pieces of feature-amount difference data stored in the database 209 are used. Moreover, at the time of collation, the switch 205 is switched by the control of the control unit 206 towards the side of the collation processing section 211. In this state, when the latest x-ray photo of a patient is picked up, at step SB1 shown in FIG. 8, in the same manner as the aforementioned operation, image data corresponding to the X-ray photo is input by the X-ray device 200 in the density-value quantization section 201.

Consequently, at step SB2, the density-value quantization section 201 quantizes the image data by using representation of 256 pixels×256 pixels with density value =8 bits, and outputs this as feature amount data. This feature amount data is temporarily stored in the buffer memory 202.

At step SB3, the difference computing section 203 computes a difference between the reference feature amount data stored in the reference feature amount data storing section 204 and the feature amount data stored in the buffer memory 202, and outputs the result of computation as feature amount difference data. At step SB4, a determination is made as to whether the current process is registration or collation, and in this case, the determination is made as collation. Thus, the feature-amount difference data from the difference computing section 203 is input to the collation processing section 211 through the switch 205.

At step SB7, the collation processing section 211 sets its inner variable N to 0. At step SB8, the collation processing section 211 allows the selection section 210 to select feature-amount difference data corresponding to index (in this case, 0) that has the same value as the inner variable N, and collates this feature-amount difference data.

At step SB9, the collation processing section 211 computes the degree of similarity between the feature-amount difference data from the difference computing section 203 and the feature-amount difference data selected by the selection section 210, and this degree of similarity is made in association with the index. At step SB10, the collation processing section 211 increments the inner variable N by one.

At step SB11, the collation processing section 211 makes a determination as to whether or not the inner variable N is not more than the last index num in the database 209, and in this case, the result of the determination is made as "Yes", and the processes of step SB8 and thereafter are executed repeatedly. Consequently, the degree of similarity between the feature-amount difference data from the difference computing section 203 and each of the plurality of pieces of feature-amount difference data within the database 209 is successively computed.

When the result of determination at step SB11 becomes "No", at step SB12, the collation processing section 211 retrieves a plurality of degrees of similarity computed at step SB9 for the one having the greatest value. At step SB13, by using the index corresponding to the greatest degree of similarity retrieved at the step SB13 as a key, the collation processing section 211 refers to the feature-amount difference data corresponding to the index through the selection section 210.

At step SB14, the image re-composing section 212 generates the original feature amount data by adding the feature-amount difference data referred to by the collation processing section 211 and the reference feature amount data stored in the reference feature amount data storing section 204. Next, the image re-composing section 212 re-composes the original image data corresponding to the feature amount data by carrying out a reverse operation on the generated feature amount data.

At step SB15, the image re-composing section 212 allows the display 213 to display the original image data. Thus, one of the X-ray photos of the patient that were picked up in the past is displayed on the display 213. Here, in the second embodiment, together with the past X-ray photo, the latest X-ray photo may be displayed on the display 213 so as to make comparison with each other.

As described above, in accordance with the second embodiment, since the feature-amount difference data related to image data is stored in the database 209, it is possible to reduce the amount of memory required for data registration/collation as compared with the conventional case in which the feature amount data, as it is, is stored in the database.

Figure 9:
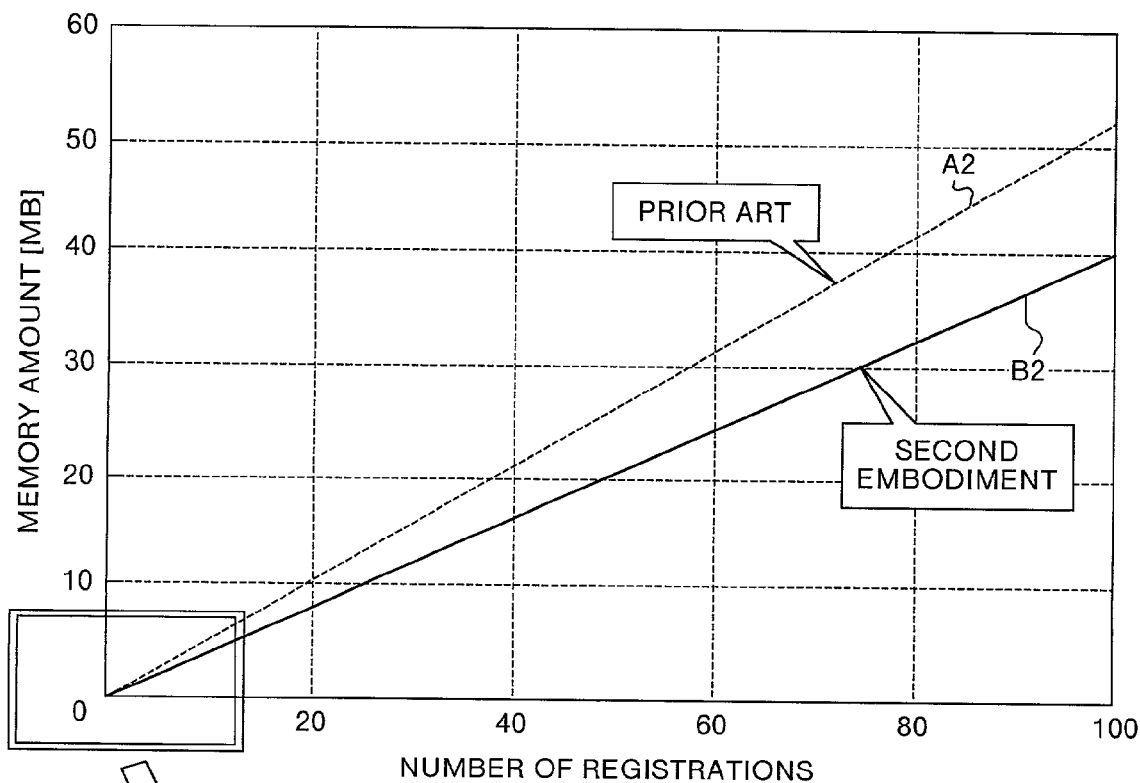
FIG. 9 is a drawing that explains the effects of the second embodiment.
Figure 9:
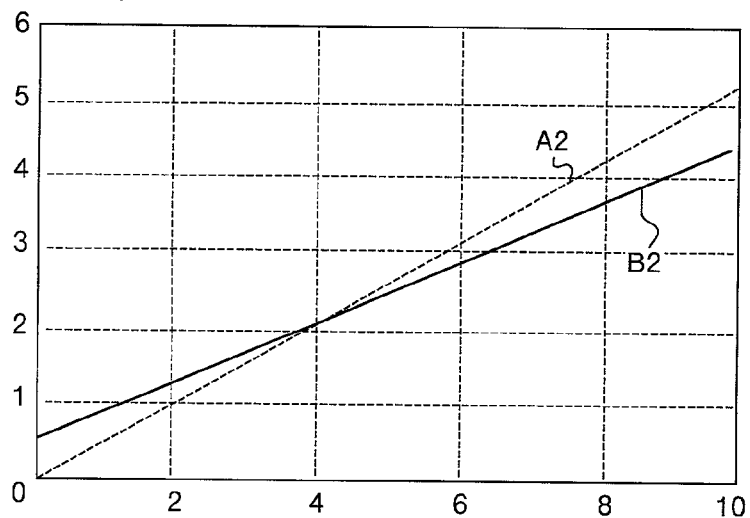

FIG. 9 is a drawing that explain the effects of the second embodiment. The axis of abscissas represents the number of registered pieces of image data in the database 209, and the axis of ordinates represents the amount of memory. As clearly seen from the characteristic line A2 indicating the conventional system and characteristic line B2 indicating the second embodiment, in the second embodiment, in the same manner as the first embodiment, as the number of registered pieces of image data increases, the difference in the amount of memory between the conventional system and the second embodiment becomes greater, indicating that the effect for the reduction in the amount of memory is high.

In the case of the number of registered pieces of image data=100, in contrast to the amount of memory=52 KB in the conventional system, the second embodiment achieves the amount of memory=40 KB, which is greatly reduced by approximately 23%. Moreover, as shown by an enlarged view indicated by an arrow, the effect of the second embodiment becomes greater as the number of registered pieces of image data increases with the number of registered pieces of image data of 4 being a turning point.

The graph shown in FIG. 9 were plotted based upon the following computing method. The feature amount data f(x, y) (see determinant (4)) is considered to represent feature-amount data in the conventional system. In this case, since each element in the feature amount data f(x, y) (see determinant (4)) has 256 representation, an amount of memory corresponding to 8 bits is required for each element.

Therefore, in the case of the conventional feature amount data f(x, y), since it is constituted by 256×256 elements, an amount of memory as much as 8×256×256 (bits) is required. Moreover, supposing that the number of registered pieces of data is x, the amount of memory reaches a total of 8×256×256x (bits).

In contrast, in the feature-amount difference data $f_s(x, y)$ (see determinant (6)), supposing that the range of each element is ±32, 1 bit is required for plus/minus representation and 5 bits are required by 32, making it possible to represent 1 element by total 6 bits. Therefore, since the feature-amount difference data $f_s(x, y)$ is constituted by 256×256 elements, a sufficient memory amount is provided by only 6×256×256 (bits).

Moreover, in the second embodiment, with respect to the reference feature amount data $f_0(x, y)$ (see determinant (5)), an amount of memory of 8×256×256 (bits) is required. Supposing that the number of registered pieces of data is x, a sufficient amount of memory is provided by (6×256×256x)+(8×256×256) (bits), indicating that the amount of memory is reduced in comparison with the conventional case.

The second embodiment assumes a case in which the density value of image data (density histogram) is used as the feature amount data. However, the edge pattern of image data may be used as the feature amount. In this case, the average edge pattern is stored in the reference feature amount data storing section 204 as the reference feature amount data, and in the difference computing section 203, a difference between the feature amount data (edge pattern) and the reference feature amount data (the average edge pattern) is computed so that feature-amount difference data is generated. The above-mentioned density histogram and edge pattern serving as the feature amount data are highly useful data since deviations depending on individuals are small in comparison with actual image data.

The first and second embodiments respectively assume cases in which either voice data or image data is used as feature-amount difference data. However, feature-amount difference data of both, the voice data and the image data, may be commonly used. The following description will discuss this case as a third embodiment.

Figure 10:
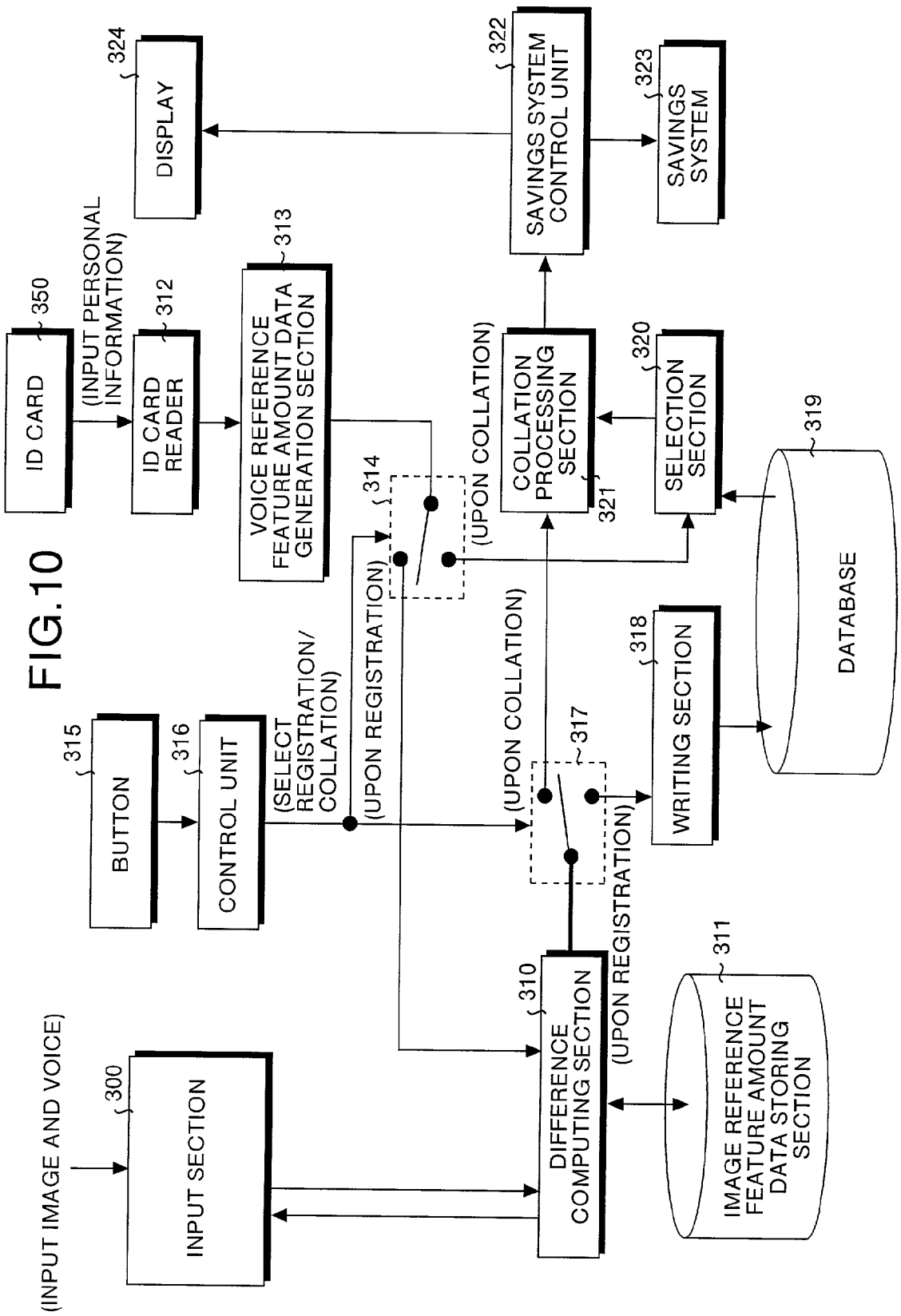
FIG. 10 is a block diagram that shows a construction of a third embodiment.

FIG. 10 is a block diagram that shows a construction of the third embodiment in accordance with the present invention. In this data collating device, image feature-amount difference data and voice feature-amount difference data that are respectively related to image data concerning fingerprints of users of monetary facilities and voice data concerning names of users of monetary facilities are used to form a database, and this is used as personal identification for the users of monetary facilities.

Figure 11:
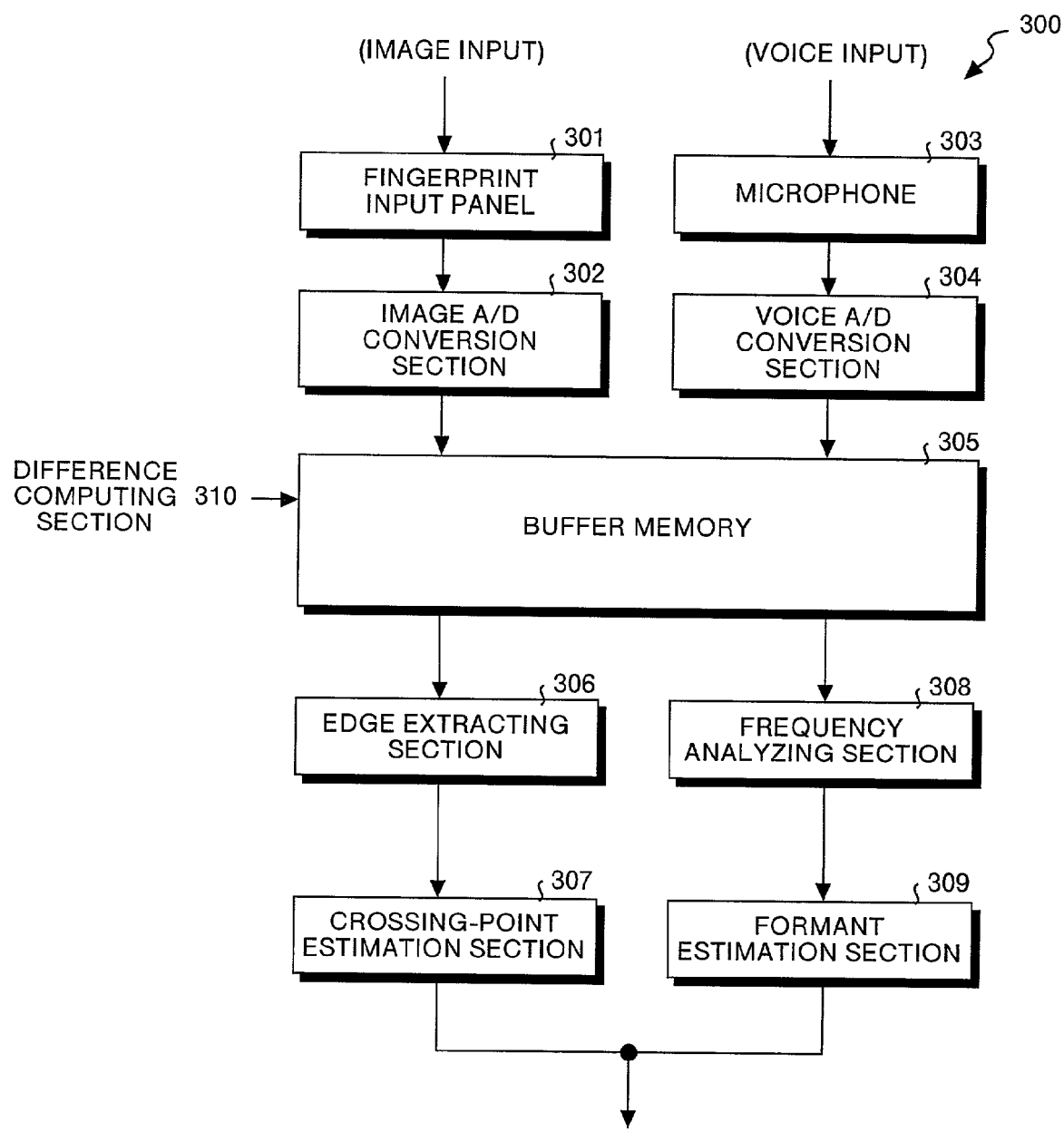
FIG. 11 is a block diagram that shows a construction of an input section 300 shown in FIG. 10.

The input section 300 is used for inputting image data concerning fingerprints and voice data concerning names, of users of a monetary facility. FIG. 11 shows a detailed structure of this input section 300. In this input section 300, the fingerprint input panel 301 reads a fingerprint of a user of the monetary facility electronically, and inputs the image data of this fingerprint.

The image A/D conversion section 302 converts image data (analog) of the fingerprint input through a fingerprint input panel 301 into digital image data. The microphone 303 converts voice of a user of the monetary facility (in this case, his or her name is pronounced) into voice data. The voice A/D conversion section 304 converts analog voice data into digital voice data.

The buffer memory 305, which is for example a RAM, temporarily stores image data from an image A/D conversion section 302, voice data from a voice A/D conversion section 304 and image feature-amount difference data as well as voice feature-amount difference data which will be described later. The edge extracting section 306 extracts edges representing raised lines of a finger print from the image data stored in the buffer memory 305. The crossing-point estimation section 307 estimates a point at which the raised lines of the fingerprint intersect with each other as a feature point from the edges extracted by the edge extracting section 306, and outputs the result of estimation as image feature amount data.

The frequency analyzing section 308 analyzes the spectrum of the voice data stored in the buffer memory 305 in the same manner as the frequency analyzing section 104 (see FIG. 1). Based upon the spectrum analyzed by the frequency analyzing section 308, the Formant estimation section 309 estimates the time-based amount of change in the frequency of the Formant representing the feature amount of a personal voice, and outputs the result of estimation as voice feature amount data, in the same manner as the Formant estimation section 105 (see FIG. 1).

Returning to FIG. 10, the difference computing section 310 is provided with a function for calculating the voice feature-amount difference data and image feature-amount difference data. In other words, the difference computing section 310 computes a difference between the voice feature amount data from the buffer memory 305 and the voice reference feature amount data generated by a voice reference feature amount data generation section 313, which will be described later, and outputs this as voice feature-amount difference data. This voice reference feature amount data is equivalent to the reference feature amount data stored in the reference feature amount data storing section 107 shown in FIG. 1.

Moreover, the difference computing section 310 computes a difference between the image feature amount data from the buffer memory 305 and the image reference feature amount data stored in the image reference feature amount data storing section 311, and outputs the resulting data as image feature-amount difference data. This image reference feature amount data is equivalent to the reference feature amount data stored in the reference feature amount data storing section 204 shown in FIG. 6.

Th ID card reader 312 is a device for reading personal information from an ID card 350 on which the personal information (name, account number, etc.) is recorded. The voice reference feature amount data generation section 313 refers to a voice reference feature amount data table (not shown) that is a collection of pieces of voice reference feature-amount data for respective pronunciations, and generates voice reference feature amount data corresponding to a name contained in the personal information. Moreover, the voice reference feature amount data generation section 313 also has a function for outputting personal information (name, account number) read by the ID card reader 312.

The first switch 314 switches output destinations of the voice reference feature amount data and personal information from the voice reference feature amount data generation section 313. In other words, when the voice feature amount difference data and image feature amount difference data are registered in the database 209, the first switch 314 switches the output destinations of the voice reference feature amount data and personal information released from the voice reference feature amount data generation section 313 to the difference computing section 310.

When the voice feature-amount difference data and the image feature-amount difference data from the difference computing section 310 are collated with the voice feature-amount difference data and the image feature-amount difference data within the database 319, the first switch 314 switches the output destinations of the personal information released from the voice reference feature amount data generation section 313 to the selection section 320.

The button 315 is used for making a selection on registration/collation. The control unit 316 controls and switches the first switch 314 and the second switch 317 depending on the state of the button 315.

The second switch 317 switches the output destinations of the voice feature amount difference data and image feature amount difference data from the difference computing section 310. In other words, when the voice feature-amount difference data and the image feature-amount difference data are registered in the database 319, the second switch 317 switches the output destinations of the voice feature amount difference data and image feature amount difference data released from the difference computing section 310 to the writing section 318.

Moreover, when the voice feature-amount difference data and the image feature-amount difference data from the difference computing section 310 are collated with the voice feature-amount difference data and the image feature-amount difference data within the database 319, the second switch 317 switches the output destinations of the voice feature-amount difference data and the image feature-amount difference data released from the difference computing section 310 to collation processing section 321.

Upon registration of the voice feature-amount difference data and image feature-amount difference data, the writing section 318 writes the voice feature-amount difference data and the image feature-amount difference data, successively output from the difference computing section 310, in the database 319 in association with the account number contained in the personal information read by the ID card reader 312. Therefore, a plurality of pieces of voice feature-amount difference data, image feature-amount difference data and account number data associated with these data are stored in the database 319.

FIG. 12 is a drawing that shows a structure of the database 319. The database 319 is provided with fields such as "index", "account number" and "voice feature-amount difference data/image feature-amount difference data". The field "index" is set to 0 to num, and these are respectively allocated to the plurality of pieces of voice feature-amount difference data/image feature amount difference data.

The field "account number" is data that relates to the account number opened by the user of the monetary facility. The field "voice feature-amount difference data/image feature-amount difference data" is a collection of pieces of data consisting of the voice feature-amount difference data: $F1(t1), F2(t1), \ldots, F1(tn), F2(tn)$, and image feature-amount difference data: $d1(x), d1(y), \ldots, dn(x), dn(y)$.

Returning to FIG. 10, the selection section 320 selects the voice feature-amount difference data and the image feature-amount difference data from the database 319 (see FIG. 12), using the account number as a key. Upon collation, the collation processing section 321 computes the degree of similarity between the voice feature-amount difference data and image feature-amount difference data (collation key) output from the difference computing section 310 with the voice feature-amount difference data and the image feature-amount difference data that have been stored in the database 319 and selected by the selection section 320.

Moreover, when the degree of similarity is not less than a threshold value, the collation processing section 321 determines the result of collation as "coincidence", and outputs signal "1". In contrast, when the degree of similarity is less than the threshold value, the collation processing section 321 determines the result of collation as "non-coincidence", and output signal "0".

When the result of collation in the collation processing section 321 shows "coincidence", a savings system controlling unit 322 makes a determination that the user of the monetary facility is identified as an authorized user, and controls the savings system 323 so as to execute the corresponding transaction. In contrast, when the result of collation in the collation processing section 321 shows "non-coincidence", the savings system controlling unit 322 gives an error message for personal identification on a display 324.

Operations (upon registration and collation) of the third embodiment will be explained while referring to the flow-chart shown in FIG. 13. To begin with, an explanation will be given of an operation by which registering-use voice feature-amount difference data and image feature-amount difference data are registered in the database 319 shown in FIG. 10. At the time of the registration, the first switch 314 is switched towards the side of the difference computing section 310 and the second switch 317 is switched towards the side of the writing section 318 by the control unit 316 based on the state of the button 315.

The user of the monetary facility inserts an ID card 350 into the ID card reader 312. Thus, at step SC1 shown in FIG. 13, the ID card reader 312 reads personal information (name and account number) from the ID card 350. This personal information is input to the voice reference feature amount data generation section 313.

At step SC2, the voice reference feature amount data generation section 313 refers to a voice reference feature amount data table so that it generates voice reference feature amount data corresponding to the name contained in the input personal information. Moreover, the voice reference feature amount data generation section 313 outputs account number data to the difference computing section 310 through the first switch 314. Thus, at step SC3, the difference computing section 310 stores the account number data in the buffer memory 305.

Next, the user of the monetary facility puts the fingerprint portion of a finger on a predetermined position of the fingerprint input panel 301 shown in FIG. 11. Thus, at step SC4, the finger input panel 301 reads the fingerprint electronically, and inputs the image data of this finger print. At step SC5, the image A/D conversion section 302 converts the image data (analog) of the fingerprint input from the fingerprint input panel 301 to digital image data. This image data is stored in the buffer memory 305.

At step SC6, the edge extracting section 306 extracts edges from the image data stored in the buffer memory 305. At step SC7, after the crossing-point estimation section 307 has computed image feature amount data (crossing point) from the edge, the difference computing section 310 shown in FIG. 10 computes image feature-amount difference data.

More specifically, the difference computing section 310 computes a difference between the image feature amount data from the crossing-point estimation section 307 and the image reference feature amount data stored in the image reference feature amount data storing section 311; thus, the resulting data forms image feature-amount difference data. At step SC8, the difference computing section 310 stores the image feature-amount difference data computed at step SC7 in the buffer memory 305.

Next, the user of the monetary facility utters his or her name toward the microphone 303 shown in FIG. 11. Thus, at step SC9, voice is input to the microphone 303. At step SC10, the voice A/D conversion section 304 converts voice data (analog) from the microphone 303 to digital voice data. This voice data is temporarily stored in the buffer memory 305.

At step SC11, the frequency analyzing section 308 successively reads the voice data from the buffer memory 305, and executes a frequency analysis (spectrum analysis: see FIG. 4C) on this data. At step SC12, based upon the result of analysis of the frequency analyzing section 308, the Formant estimation section 309 finds time-based changes (see FIG. 4A) in frequencies in the first Formant F1 and the second Formant F2 described in the first embodiment, and outputs the results as voice feature amount data.

At step SC13, the difference computing section 310 computes a difference between the voice reference feature amount data generated in the voice reference feature amount data generation section 313 and the voice feature amount data from the Formant estimation section 309 (see FIG. 11), thereby outputting the result as voice feature-amount difference data. At step SC14, the difference computing section 310 stores the voice feature-amount difference data in the buffer memory 305.

At step SC15, a determination is made as to whether the current process is registration or collation, and in this case, the determination is made as registration. Next, the difference computing section 310 outputs the account number data, the voice feature-amount difference data and the image feature-amount difference data, stored in the buffer memory 305, to the writing section 318 through the second switch 317.

Thus, at step SC16, the writing section 318 stores the account number data, the voice feature-amount difference data and the image feature-amount difference data in the database 319 shown in FIG. 12 as a record at the last index num (in this case, 0). The above-mentioned steps SC1 to SC16 are executed repeatedly so that pieces of account number data, voice feature-amount difference data and image feature-amount difference data, which correspond to a plurality of users of the monetary facility, are successively stored in the database 319.

Next, an explanation will be given of the collating operation in which the account number data, the voice feature-amount difference data and the image feature-amount difference data, stored in the database 319, are used. Moreover, at the time of the collation, the first switch 314 is switched to the selection section 320 and the second switch 317 is switched to the collation processing section 321 by the control of the control unit 316.

Figure 13:
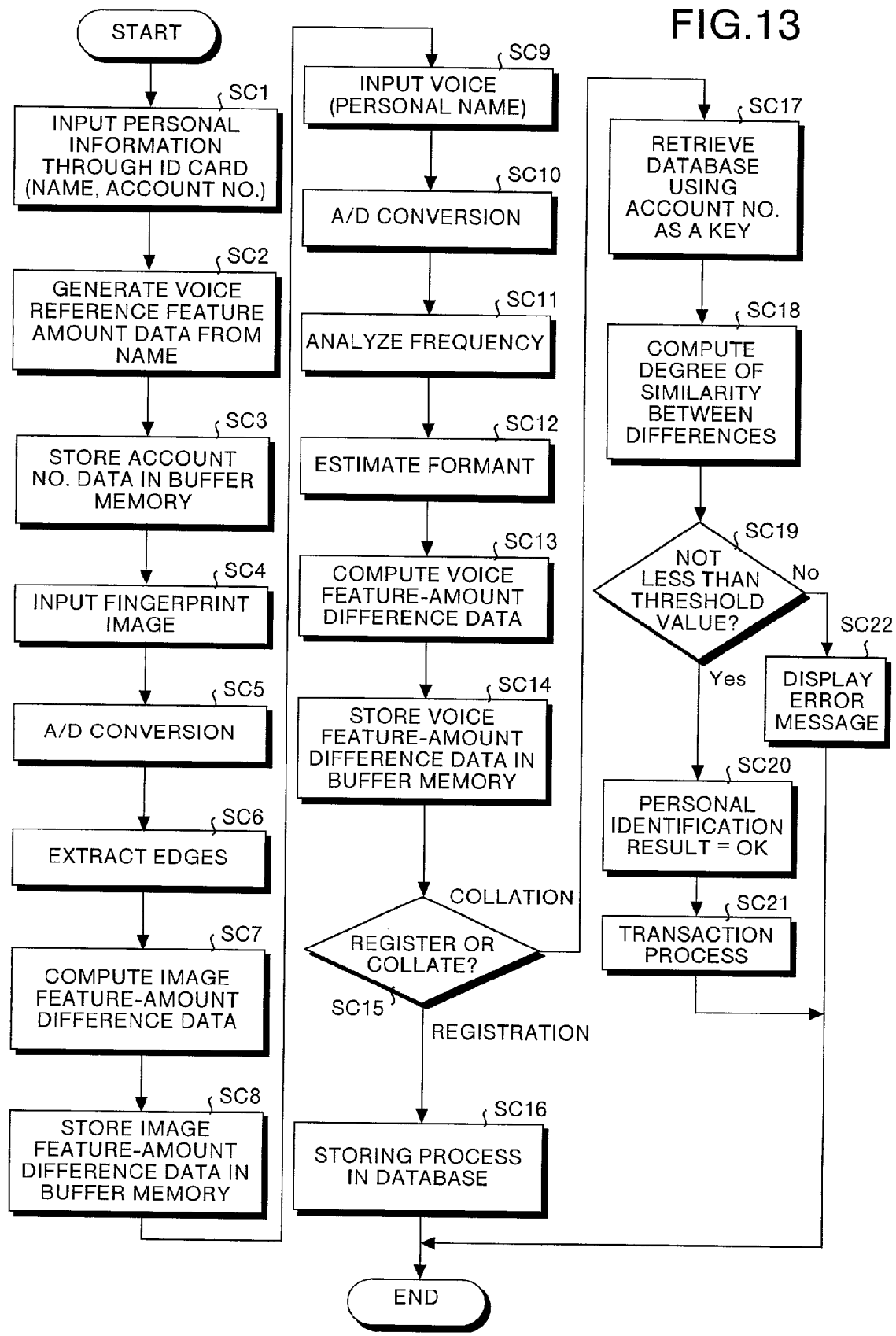
FIG. 13 is a flowchart that explains the operation of the third embodiment.

In this state, the user of the monetary facility inserts an ID card 350 into the ID card reader 312, and at step SC1 shown in FIG. 13, the ID card reader 312 reads personal information (name and account number) from the ID card 350 in the same manner as the aforementioned operation. This personal information is input to the voice reference feature amount data generation section 313.

At step SC2, in the same manner as the aforementioned operation, the voice reference feature amount data generation section 313 generates voice reference feature amount data corresponding to the name contained in the personal information. Moreover, the voice reference feature amount data generation section 313 outputs the account number data to the selection section 320 through the first switch 314. Here, at the time of the collation, the process at step SC3 is skipped.

Next, when the user of the monetary facility puts the fingerprint portion of a finger at a predetermined position of the fingerprint input panel 301 shown in FIG. 11, the operations of the steps SC4 and thereafter are executed. Then, at step SC8, the difference computing section 310 stores the image feature-amount difference data computed at step SC7 in the buffer memory 305.

Next, the user of the monetary facility utters his or her name toward the microphone 303 shown in FIG. 11. Then, at steps SC9 and thereafter, the aforementioned operations are carried out. Then, at step SC14, the difference computing section 310 stores the voice feature-amount difference data in the buffer memory 305.

At step SC15, a determination is made as to whether the current process is registration or collation, and in this case, the determination is made as collation. Next, the difference computing section 310 outputs the account number data, the voice feature-amount difference data and the image feature-amount difference data, stored in the buffer memory 305, to the collation processing section 321 through the second switch 317.

Thus, at step SC17, the selection section 320 retrieves the database 319 for the voice feature-amount difference data and the image feature-amount difference data by using the account number data contained in the personal information from the voice reference feature amount data generation section 313 as a key. At step SC18, the collation processing section 321 computes the degree of similarity between the voice feature-amount difference data and image feature-amount difference data retrieved by the selection section 320 and the voice feature-amount difference data and image feature-amount difference data from the difference computing section 310.

At step SC19, the collation processing section 321 makes a determination as to whether or not the degree of similarity computed at step SC18 is not less than a threshold value. In this case, supposing that the result of determination at step SC19 is "Yes", the collation processing section 321 makes a determination that the user is identified as an authorized user at SC20, and outputs signal "1" (coincidence of data) to the savings system control unit 322. Thus, at step SC21, the savings system control unit 322 controls the savings system 323 so as to execute the transaction process related to the user of the monetary facility.

In contrast, when the result of determination at step SC19 is "No", that is, the result of the personal identification is "NG", at step SC22, the collation processing section 321 outputs signal "0" (non-coincidence of data) to the savings system control unit 322, with the result that the savings system control unit 322 gives an error message on the display 324.

As described above, in accordance with the third embodiment, the voice feature-amount difference data related to voice data and the image feature-amount difference data related to image data are stored in the database 319; therefore, it is possible to reduce the amount of memory required for data registration/collation as compared with the conventional case in which the feature amount data, as it is, is stored in the database. Moreover, in accordance with the third embodiment, since both of the voice feature-amount difference data and the image feature-amount difference data are used for personal identification, it is possible to improve the security of the system.

The first to third embodiments of the invention have been thus described above by reference to figures. However, specific structural examples are not intended to be limited by the first to third embodiments, and it will be obvious that the same may be varied in many ways. Such variations are not to be regarded as a departure from the spirit and scope of the invention.

Figure 14:
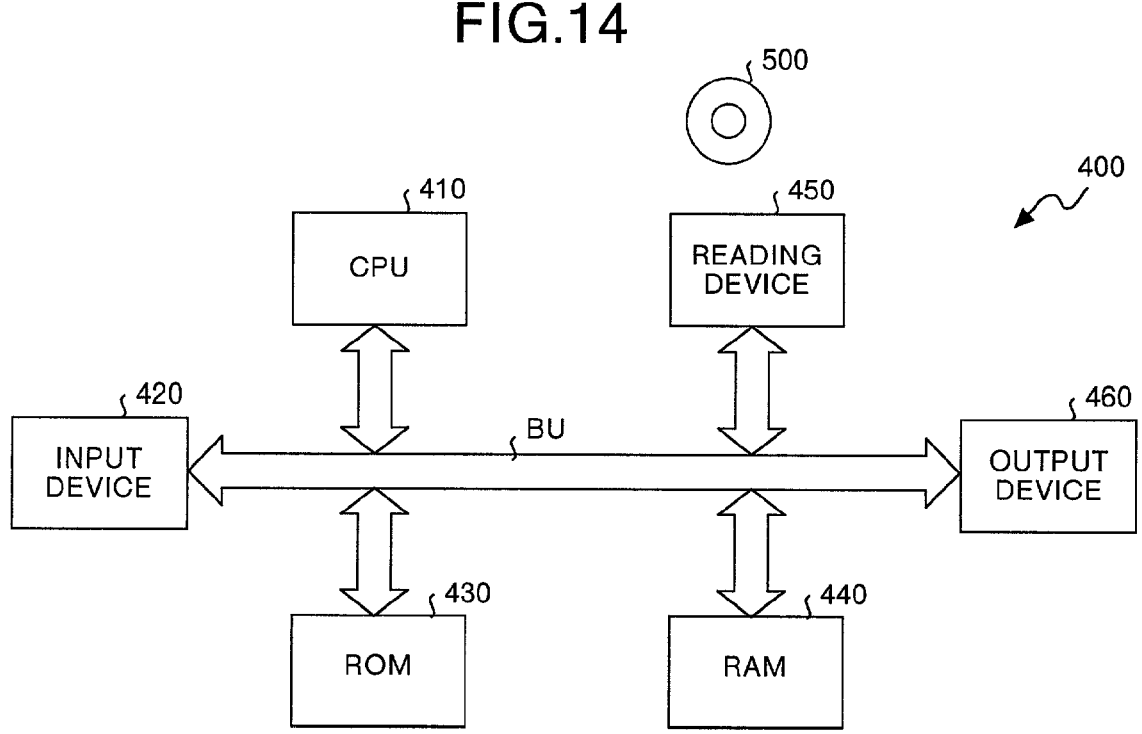
FIG. 14 is a block diagram that shows a modified example of the first to third embodiments.
Figure 15:
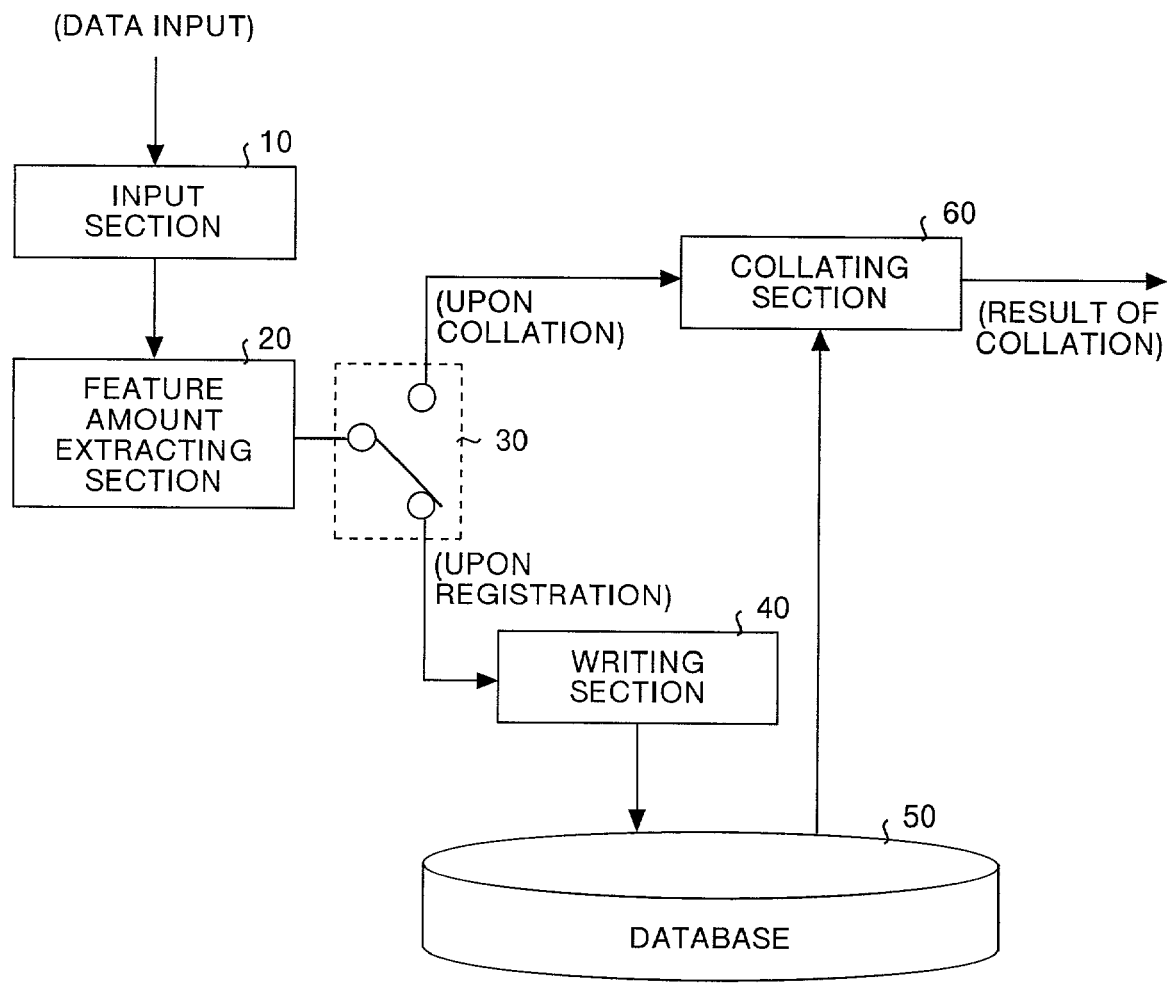
FIG. 15 is a block diagram that shows a construction of a conventional data collating device.

For example, in the first to third embodiments, a computer program for achieving the functions of the data collating device may be recorded in a computer-readable recording medium 500 shown in FIG. 14. This computer program recorded stored in the recording medium 500 may be read by the computer 400. Thus, when the computer 400 executes the read computer program, the method and device according to the present invention may be realized on a computer.

The computer 400, shown in FIG. 14, is provided with the CPU 410 for executing the above-mentioned program, the input device 420 such as a keyboard and/or a mouse, the ROM 430, the RAM 440 for storing operation parameters, etc., the reading device 450 for reading the program from the recording medium 500, the display, the output device 460 such as a printer, and the bus BU for connecting the respective parts.

After having read the program recorded in the recording medium 500 via the reading device 450, the CPU 410 executes the program so that the aforementioned sequence of processes is carried out. The recording medium 500 includes a portable-type recording medium, such as an optical disk, a floppy disk, and a hard disk, and a transfer medium such as a network, that temporarily records and holds the data.

Moreover, in the first to third embodiments, the following factors may be used as the voice feature amount data related to voice data and the image feature amount data related to image data.

(Voice Feature Amount Data)
(1) Pitch: Tones of sound
(2) Power: Loudness of sound
(3) LPC (Linear Predictive Coding) coefficient: Coefficient obtained from sample values of voice waveform by using a linear prediction method
(4) LSP (Line Spectra Pair) coefficient: Voice parameter used in a voice synthesizing method
(5) FFT (Fast Fourier Transform) average: Average of spectra
(6) PARCOR (PARtial auto-CORrelation) coefficient: Voice parameter used in a voice synthesizing method (Image Feature Amount Data)
(1) DCT (Discrete Cosine Transform): One of image compression techniques
(Color) Total of pigments
(Classified by coloring) Density histogram Moreover, examples of other image data include: CT (Computer Tomography) image data, MRI (Magnetic Resonance Imaging) image data, face image data, etc.

Moreover, in the first embodiment, with respect to the first Formant F1 (715 Hz, 555 Hz, 304 Hz) and the second Formant F2 (1120 Hz, 1752 Hz, 2366 Hz) in the feature amount data X(t) (see determinant (1)), preliminarily predicted ranges may be standardized as follows:
(a) Range of the first Formant F1: 0 to 1024 [Hz]
(b) Range of the second Formant F2: 1024 to 3072 [Hz]: 1024 to (1024+2048) [Hz]

The above-mentioned 1024 [Hz] is a demarcation value of the two ranges.

In the difference computing in this case, the difference computing section 106 shown in FIG. 1 subtracts the demarcation value 1024 from each of the factors (1120 Hz, 1752 Hz, 2366 Hz) of the second Formant F2 in the feature amount data X(t) (see determinant (1)) so that feature-amount difference data X'(t) represented by the following determinant (7) is found. Here, with respect the first Formant F1 in the feature amount data X(t), no operations are carried out.

$$X'(t) = \begin{bmatrix} 715, & 96 \\ 555, & 728 \\ 304, & 1342 \end{bmatrix} \quad (7)$$

In other words, the first column of determinant (7) describes the respective elements (715 Hz, 555 Hz, 304 Hz) of the first Formant F1 (see determinant (1)). Moreover, the second column of determinant (7) describes difference frequencies (96 (1120−1024)Hz, 728 (1752−1024)Hz, 1342 (2366−1024)Hz) related to the second F2. Thereafter, in the operation of the first embodiment, in place of the feature amount difference data $X_s(t)$ (see determinant (3) the feature amount difference data X'(t) (see determinant (7)) is used.

As explained in the first embodiment, supposing that the upper limit value of each element in the feature amount data X(t) (see determinant (1)) is 4096 Hz and that the number of registered people is x, a memory of 12×6x (bits) is required in the conventional case.

In contrast, in the case of the application of the above-mentioned feature-amount difference data X'(t) (see determinant (7)), supposing that the number of registered people is x, a sufficient amount of memory is provided by (10×3+11×3)x+12×4 (bits), indicating that it is possible to reduce the amount of memory as compared with the conventional case.

In other words, with respect to the feature amount difference data X'(t), the first column is represented by 10 (binary representation of 1024)×3 elements, and the second column is represented by 11 (binary representation of 2048)×3 elements. Therefore, an amount of memory (10×3+11×3)x is obtained by multiplying the total of these by the number of registered people x. Moreover, 12×4 (bits) is an amount of memory used for the above-mentioned computing processes.

As described above, in accordance with the present invention, since the feature-amount difference data is stored in a database, it is possible to reduce the amount of memory required for data registration/collation as compared with the conventional case in which the feature amount data, as it is, is stored in the database.

Moreover, a time-based change in feature amount data is found, and the resulting data is used as the feature amount data. Therefore, for example, a time-based change in Formant frequencies related to voice data can be used as the feature amount data, thereby making it possible to widen the range of the application of the present invention.

Furthermore, the first feature-amount difference data and the second physical amount difference data are stored in the database; therefore, in comparison with the conventional case in which the feature amount data, as it is, is stored in the database, it is possible to reduce the amount of memory required for data registration/collation, and also to carry out a composite-type collating process related to two kinds of physical amount data.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer storage medium having instructions stored therein, which when executed on a computer, causes the computer to realize:
   a feature amount data extracting unit which extracts feature amount data from a physical amount data;
   a feature-amount difference data computing unit which calculates a difference between the feature amount data and a predetermined reference feature amount data as the feature-amount difference data;
   a registering unit which registers the feature-amount difference data in a database; and
   a collating unit which collates the feature-amount difference data corresponding to the physical amount data input upon collation with the feature amount difference data registered in said database, and outputs the result of collation,
   wherein the feature-amount difference data represents, not a time-based change of data, but a difference between a personal feature and the predetermined feature amount data which is unchanged as the personal feature.

2. A computer storage medium according to claim 1, wherein said feature amount data extracting unit calculates a time-based change in the feature amount data to provide the resulting change as the feature amount data.

3. A computer storage medium according to claim 1, wherein the physical amount data is voice data, and
   said collating unit outputs the result of collation to a controlled device that uses voice data.

4. A computer storage medium according to claim 1, wherein the physical amount data is image data, and
   said collating unit outputs the result of collation to a controlled device that uses image data.

5. A computer storage medium according to claim 1 further including instruction which realizes a reading unit which reads the feature-amount difference data from said database when the collation by said collating unit indicates coincidence.

6. A computer storage medium according to claim 5 further including instruction which realizes a physical amount data generation unit which generates the physical amount data based on the feature-amount difference data read by said reading unit and the reference feature amount data.

7. A computer storage medium having instructions stored therein, which when executed on a computer causes the computer to realize:
   a first feature amount data extracting unit which extracts a first feature amount data from a first physical amount data;
   a first feature-amount difference data computing unit which calculates a difference between the first feature amount data and a predetermined first reference feature amount data as the first feature amount difference data;
   a second feature amount data extracting unit which extracts second feature amount data from a second physical amount data;
   a second feature-amount difference data computing unit which calculates a difference between the second feature amount data and a predetermined second reference feature amount data as the second feature amount difference data;
   a registering unit which registers the first feature-amount difference data and the second feature-amount difference data in a database; and
   a collating unit which collates the first feature-amount difference data corresponding to the first physical amount data input upon collation with the first feature-amount difference data registered in said database, collates the second feature-amount difference data corresponding to the second physical amount data input upon collation with the second feature amount difference data registered in said database, and outputs the result of collation,
   wherein the first feature-amount difference data and the second feature-amount difference data represent, not a time-based change of data, but a difference between a personal feature and the first predetermined feature amount data and the second predetermined feature amount data which are unchanged as the personal feature.

8. A computer storage medium according to claim 7, wherein the first physical amount data is voice data and the second physical amount data is image data.

9. A computer storage medium according to claim 7, wherein said collating unit outputs the result of collation to a controlled device that is controlled based on the result of collation.

10. A method of collating data comprising the steps of:
    detecting a physical amount and converting the physical amount into digital physical amount data:
    extracting a feature amount data from the digital physical amount data;
    calculating a difference between the feature amount data and a predetermined reference feature amount data as the feature-amount difference data;
    storing the feature-amount difference data in a database; and
    collating the feature-amount difference data corresponding to the digital physical amount data input upon collation with the feature amount difference data registered in said database, and outputting the result of collation, wherein the feature-amount difference data represents, not a time-based change of data, but a difference between a personal feature and the predetermined feature amount data which is unchanged as the personal feature.

11. A device for collating data comprising:
a feature amount data extracting unit which extracts feature amount data from a physical amount data;
a feature-amount difference data computing unit which calculates a difference between the feature amount data and a predetermined reference feature amount data as the feature-amount difference data;
a registering unit which registers the feature-amount difference data in a database; and
a collating unit which collates the feature-amount difference data corresponding to the physical amount data input upon collation with the feature amount difference data registered in said database, and outputs the result of collation,
wherein the feature-amount difference data represents, not a time-based change of data, but a difference between a personal feature and the predetermined feature amount data which is unchanged as the personal feature.

12. A computer storage medium according to claim 1, wherein said feature-amount difference data computing unit uses standardized data obtained by standardizing a range of the feature amount data instead of the reference feature amount data, and calculates a feature-amount difference data including the feature amount data within the range and a difference between the standardized data and a feature amount data beyond the range.

13. A computer storage medium having instructions stored therein, which when executed on a computer, causes the computer to realize:
a feature amount data extracting unit which extracts feature amount data from a physical amount data;
a feature-amount difference data computing unit which calculates a difference between the feature amount data and a predetermined reference feature amount data as the feature-amount difference data;
a registering unit which registers the feature-amount difference data in a database;
a collating unit which collates the feature-amount difference data corresponding to the physical amount data input upon collation with the feature amount difference data registered in said database, and outputs the result of collation, and
wherein said feature-amount difference data computing unit uses standardized data obtained by standardizing a range of the feature amount data instead of the reference feature amount data, and calculates a feature-amount difference data including the feature amount data within the range and a difference between the standardized data and a feature amount data beyond the range.

14. A method comprising: performing an analysis process comprising:
detecting a physical amount and converting the physical amount into digital physical amount data;
extracting feature amount data from the digital physical amount data;
calculating a difference between the feature amount data and a predetermined reference feature amount data as the feature-amount difference data;
registering the feature-amount difference data in a database; and
collating the feature-amount difference data corresponding to the digital physical amount data input upon collation with the feature amount difference data registered in said database, and outputs the result of collation; and
repeating the analysis process without changing the value of the predetermined reference feature amount data,
wherein the feature-amount difference data represents, not a time-based change of data, but a difference between a personal feature and the predetermined feature amount data which is unchanged as the personal feature.

* * * * *

UNITED STATES PATENT AND TRADEMARK OFFICE
CERTIFICATE OF CORRECTION

PATENT NO. : 7,039,903 B2
APPLICATION NO. : 09/983370
DATED : May 2, 2006
INVENTOR(S) : Takeshi Otani et al.

It is certified that error appears in the above-identified patent and that said Letters Patent is hereby corrected as shown below:

Column 22, Line 57, after "data" change ":" to --;--.

Signed and Sealed this

Twenty-first Day of November, 2006

JON W. DUDAS
*Director of the United States Patent and Trademark Office*